(12) United States Patent
Ozeki

(10) Patent No.: US 11,465,253 B2
(45) Date of Patent: Oct. 11, 2022

(54) GRINDER SELECTION DEVICE AND GRINDER SELECTION METHOD

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 457 days.

(21) Appl. No.: 16/799,189

(22) Filed: Feb. 24, 2020

(65) Prior Publication Data
US 2020/0306908 A1    Oct. 1, 2020

(30) Foreign Application Priority Data

Mar. 27, 2019 (JP) .............................. JP2019-061012

(51) Int. Cl.
| | |
|---|---|
| *B24B 49/04* | (2006.01) |
| *B23Q 15/12* | (2006.01) |
| *G06N 3/08* | (2006.01) |
| *G07C 3/08* | (2006.01) |
| *G05B 19/416* | (2006.01) |

(52) U.S. Cl.
CPC .............. *B23Q 15/12* (2013.01); *B24B 49/04* (2013.01); *G06N 3/08* (2013.01); *G07C 3/08* (2013.01); *G05B 19/4163* (2013.01); *G05B 2219/37* (2013.01); *G05B 2219/45161* (2013.01)

(58) Field of Classification Search
CPC ..... B23Q 15/12; B24B 49/04; B24B 27/0038; B24B 27/0076; B24B 51/00; B24B 49/00; G06N 3/08; G06N 20/00; G07C 3/08; G05B 19/4163; G05B 2219/37;
(Continued)

(56) References Cited

U.S. PATENT DOCUMENTS

| | | | | |
|---|---|---|---|---|
| 4,402,161 A | * | 9/1983 | Price .................... | G05B 19/184 451/239 |
| 5,473,532 A | * | 12/1995 | Unno ............... | G05B 19/40937 700/32 |

(Continued)

FOREIGN PATENT DOCUMENTS

JP    5-123939    5/1993

*Primary Examiner* — Harry Y Oh
(74) *Attorney, Agent, or Firm* — Wenderoth, Lind & Ponack, L.L.P.

(57) ABSTRACT

A grinder selection device includes: an input unit that inputs a grinding condition for a workpiece as a grinding target of grinding machining including at least the geometry of the workpiece and vibration data indicating vibration of a grinding machine, and grinder information about one or more grinders as grinder candidates to be used for the grinding machining; a learned model acquired through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, and grinder information about an arbitrary grinder, the label data being data indicating the adequacy or inadequacy of a combination between the grinding condition and the grinder information about the grinder; and a judgment unit.

12 Claims, 18 Drawing Sheets

(58) Field of Classification Search
CPC ...... G05B 2219/45161; G05B 13/0265; G05B 2219/33023; G05B 19/4097
See application file for complete search history.

(56) References Cited

U.S. PATENT DOCUMENTS

| | | | |
|---|---|---|---|
| 6,445,971 B1* | 9/2002 | Gottschalk | B23Q 1/66 483/1 |
| 10,935,967 B2* | 3/2021 | Kuwabara | G05B 19/4086 |
| 2008/0014836 A1* | 1/2008 | Meusburger | B24B 19/125 451/5 |
| 2018/0067471 A1* | 3/2018 | Saitou | G05B 19/40932 |

* cited by examiner

GRINDER SELECTION DEVICE AND GRINDER SELECTION METHOD

This application is based on and claims the benefit of priority from Japanese Patent Application No. 2019-061012, filed on 27 Mar. 2019, the content of which is incorporated herein by reference.

BACKGROUND OF THE INVENTION

Field of the Invention

The present invention relates to a grinder selection device and a grinder selection method.

Related Art

Unlike in the case of a cutting tool, for selection of a grinder, consideration should be given to various elements such as a material for a workpiece (metal or nonmetal), a grinder type (flat, ring, hollow, or tapered cup), an abrasive grain type (aluminum, silicon carbide, or cubic boron nitride), a grit size (grain size), a binder type (resin, metal, or vitrified), a grade (A (soft) to Z (hard)), a tissue (sizes of pores in a grinder), a grinder state that might be caused during grinding (shedding, glazing, or loading), self-sharpening effect of a grinder (sharpness restoration level during grinding), a peripheral velocity, a feedrate, a depth of cut, etc. For this reason, machining trouble at a grinding machine is mainly caused by erroneous selection of a grinder, so that selection of a grinder requires empirical knowledge of an expert.

In this regard, according to a known technique, among associations between intended conditions for a grinding target such as material, geometry, required accuracy, etc. and grinder conditions for a grinder such as material, outer diameter, grit size, etc., a preferable association extracted in advance on the basis of empirical knowledge about grinding with a grinder is stored in a grander condition file, and an adequate grinder is selected using this grinder condition file. See patent document 1, for example.

Patent Document 1: Japanese Unexamined Patent Application, Publication No. H05-123939

SUMMARY OF THE INVENTION

For reason such as vibration at a grinding machine occurring depending on the grinding machine, for example, the grinder condition file is required to be generated for each grinding machine. Generating the grinder condition file also requires empirical knowledge of an expert and causes a problem in terms of being time consuming and troublesome.

Thus, selecting an optimum grinder responsive to a grinding condition independently of a grinding machine has been desired.

One aspect of a grinder selection device of this disclosure is a grinder selection device that selects a grinder to be used for grinding machining by a grinding machine prior to the grinding machining. The grinder selection device includes: an input unit that inputs a grinding condition for a workpiece as a grinding target of the grinding machining including at least the geometry of the workpiece and vibration data indicating vibration of the grinding machine, and grinder information about one or more grinders to become grinder candidates to be used for the grinding machining; a learned model acquired in advance through supervised learning using training data containing input data and label data, the input data containing an arbitrary grinding condition for a workpiece as a grinding target of grinding machining by an arbitrary grinding machine including at least the geometry of the workplace and vibration data indicating vibration of the grinding machine, and grinder information about an arbitrary grinder, the label data being data indicating the adequacy or inadequacy of a combination between the grinding condition and the grinder information about the grinder; and a judgment unit. By using the learned model, the judgment unit judges a grinder candidate forming an adequate combination with a grinding condition for the grinding machining on the basis of the grinder information input by the input unit about one or more grinders to become grinder candidates to be used for the grinding machining.

One aspect of a grinder selection device of this disclosure is a grinder selection device that selects a grinder to be used for grinding machining by a grinding machine prior to the grinding machining. The grinder selection device includes: an input unit, that inputs a grinding condition for a workpiece as a grinding target of the grinding machining including at least the geometry of the workpiece and vibration data indicating vibration of the grinding machine; a learned model acquired in advance through supervised learning using training data containing input data and label data, the input data containing an arbitrary grinding condition for a workpiece as a grinding target of grinding machining an arbitrary grinding machine including at least the geometry of the workpiece and vibration data indicating vibration of the grinding machine, the label data being data indicating grinder information about a grinder adequate for the grinding condition; and an output unit. By using the learned model, the output unit outputs grinder information about a grinder forming an adequate combination with a grinding condition for the grinding machining on the basis of the grinding condition input by the input unit.

One aspect of a grinder selection method of this disclosure is a grinder selection method realized by a computer for selecting a grinder to be used for grinding machining by a grinding machine prior to the grinding machining. The grinder selection method includes: an input step of inputting a grinding condition for a workpiece as a grinding target of the grinding machining including at least the geometry of the workpiece and vibration data indicating vibration of the grinding machine, and grinder information about one or more grinders to become grinder candidates to be used for the grinding machining; and a judgment step of judging a grinder candidate forming an adequate combination with a grinding condition for the grinding machining on the basis of the grinder information input in the input step about one or more grinders to become grinder candidates to be used for the grinding machining by using a learned model acquired in advance through supervised learning using training data containing input data and label data. The input data contains an arbitrary grinding condition for a workpiece as a grinding target of grinding machining by an arbitrary grinding machine including at least the geometry of the workpiece and vibration data indicating vibration of the grinding machine, and grinder information about an arbitrary grinder. The label data is data indicating the adequacy or inadequacy of a combination between the grinding condition and the grinder information about the grinder.

One aspect of a grinder selection method of this disclosure is a grinder selection method realized by a computer for selecting a grinder to be used for grinding machining by a grinding machine prior to the grinding machining. The grinder selection method includes: an input step of inputting a grinding condition for a workpiece as a grinding target of the grinding machining including at least the geometry of the workpiece and vibration data indicating vibration of the grinding machine; and an output step of outputting grinder information about a grinder forming an adequate combination with a grinding condition for the grinding machining on the basis of the grinding condition input in the input step by using a learned model acquired in advance through supervised learning using training data containing input data and label data. The input data contains an arbitrary grinding condition for a workpiece as a grinding target of grinding machining by an arbitrary grinding machine including at least the geometry of the workpiece and vibration data indicating vibration of the grinding machine. The label data is data indicating grinder information about a grinder adequate for the grinding condition.

According to one aspect, an optimum grinder responsive to a grinding condition can be selected independently of a grinding machine.

DETAILED DESCRIPTION OF THE INVENTION

Embodiments of this disclosure will be described below using the drawings.

First Embodiment

Figure 1:
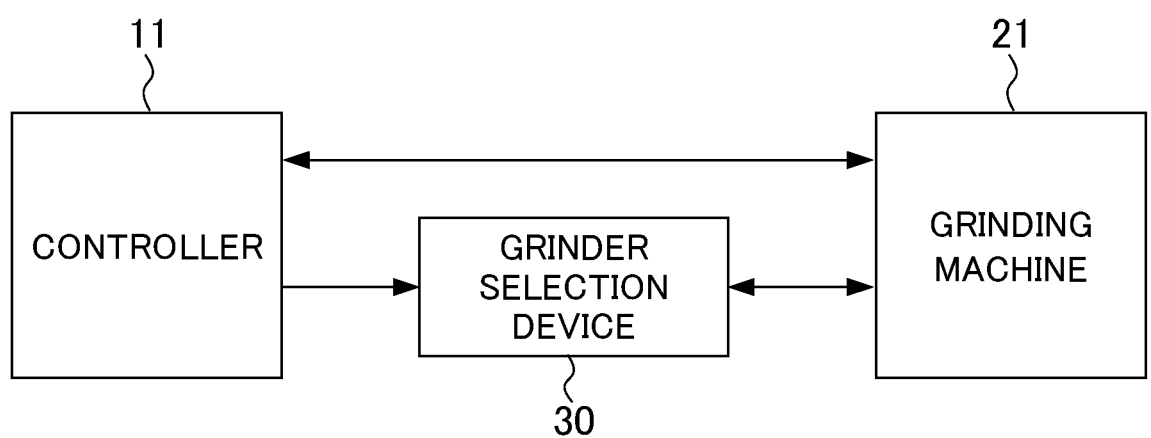
FIG. 1 shows an entire configuration of a numerical control system according to a first embodiment.

FIG. 1 shows an entire configuration of a numerical control system including a grinder selection device 30 according to a first embodiment. The numerical control system includes a controller 11 and a grinding machine 21 in addition to the grinder selection device 30.

The controller 11, the grinding machine 21, and the grinder selection device 30 may be connected directly to each other through a connection interface not shown. The controller 11, the grinding machine 21, and the grinder selection device 30 may be connected to each other through a network not shown such as a local area network (LAN) or the Internet, for example. In this case, each of the controller 11, the grinding machine 21, and the grinder selection device 30 includes a communication unit not shown for communicating with each other through such connection. As will be described later, the controller 11 may include the grinder selection device 30. Alternatively, the grinding machine 21 may include the controller 11.

The controller 11 is a numerical controller publicly known by a person in the art. The controller 11 generates a motion command on the basis of control information and transmits the generated motion command to the grinding machine 21, thereby controlling the motion of the grinding machine 21. The controller 11 further outputs the control information to the grinder selection device 30. The control information contains a machining program and a parameter value set at the controller 11.

The controller 11 may store a list of grinder information in advance about grinders selectable for the grinding machine 21 as a grinder data table into a hard disk drive (HDD) not shown, for example. The grinder information includes a grinder type (flat, ring, hollow, or tapered cup), an abrasive grain type (such as aluminum, silicon carbide, or cubic boron nitride), a grit size (grain size), a binder type (resin, metal, or vitrified), a grade (A (soft) to Z (hard)), a tissue (sizes of pores in a grinder), etc.

The grinding machine 21 is a machine for grinding of a workpiece using a grinder selected by the grinder selection device 30 on the basis of the motion command from the controller 11. The grinding machine 21 feeds information indicating a motion state based on the motion command from the controller 11 back to the controller 11. The grinding machine 21 includes a vibration sensor not shown, for example, and can feed vibration generated by the grinding machine 21 itself as vibration data back to the controller 11. The controller 11 may output the fed back vibration data to the grinder selection device 30 together with the foregoing control information. Alternatively, the grinding machine 21 may output the vibration data directly to the grinder selection device 30.

The first embodiment is applicable not only to the grinding machine 21 but also to various machines such as a machine tool and an industrial robot usable for grinding machining.

Prior to grinding machining by the grinding machine 21, the grinder selection device 30 selects a grinder optimum for a workpiece to be ground by the grinding machine 21 from selectable grinders (also called "grinder candidates") stored in the grinder data table, for example, responsive to a grinding condition for the workpiece as a grinding target of the grinding machining including at least the geometry of the workpiece and vibration data indicating vibration of the grinding machine 21.

Instead of the controller 11, prior to the grinding machining by the grinding machine 21, the grinder selection device 30 may store the grinder data table containing a list of grinder information about grinder candidates selectable for the grinding machine 21 and/or store vibration data about the grinding machine 21 measured by idle running, for example, in advance into a HDD not shown, for example.

<Functional Block Diagram of Grinder Selection Device 30>

Figure 2:
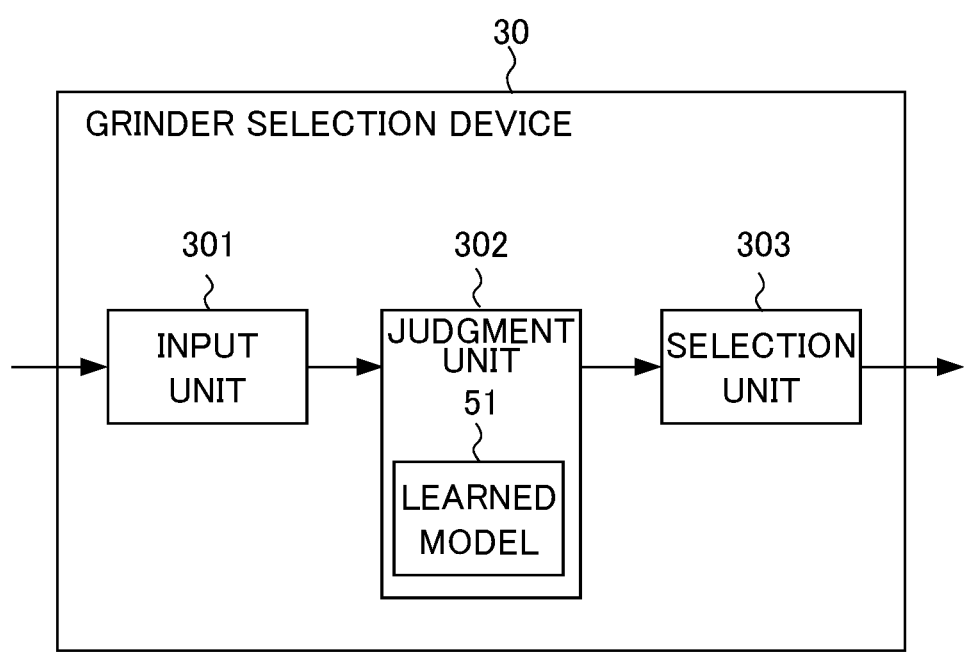
FIG. 2 is a functional block diagram showing an exemplary functional configuration of a grinder selection device according to the first embodiment.

FIG. 2 is a functional block diagram showing an exemplary functional configuration of the grinder selection device 30 according to the first embodiment.

As shown in FIG. 2, the grinder selection device 30 is configured to include an input unit 301, a judgment unit 302, a selection unit 303, and a learned model 51.

To realize motions of the functional blocks in FIG. 2, the grinder selection device 30 includes an operation processing unit such as a central processing unit (CPU) not shown. The grinder selection device 30 further includes an auxiliary storage unit not shown storing various control programs such as a read only memory (ROM) or a HDD, and a main storage unit not shown such as a random access memory (RAM) for storing data temporarily required for execution of a program by the operation processing unit.

In the grinder selection device 30, the operation processing unit reads an OS and application software from the auxiliary storage unit, and performs operation processing on the basis of the read OS and application software while developing the read OS and application software on the main storage unit. The grinder selection device 30 controls each hardware on the basis of a result of the operation. By doing so, processes by the functional blocks in FIG. 2 are realized. Namely, the grinder selection device 30 can be realized by collaborative operation of the hardware and the software.

Prior to grinding machining by the grinding machine 21, the input unit 301 inputs a grinding condition for a workpiece as a grinding target of the grinding machining including at least the geometry of the workpiece and vibration data indicating vibration of the grinding machine 21 from the controller 11, for example, and inputs grinder information from the grinder data table about one or more grinder candidates designated from an operator, for example. The input unit 301 outputs the input grinding condition for the workpiece as a grinding target and the input grinder information about one or more grinder candidates to the judgment unit 302. The grinding condition includes the type of a member to be ground corresponding to the workpiece as a grinding target, the geometry of the member to be ground, a material for the member to be ground (metal such as stainless steel or alloy steel, or nonmetal such as ceramic), a degree of finishing (roughing or precise finishing), the presence or absence of heat treatment (quenching) on the member to be ground, grinding allowance (large or small), a peripheral velocity of a grinder, a feedrate of the grinder, a depth of cut of the grinder, vibration data about the grinding machine 21, etc.

Figure 3:
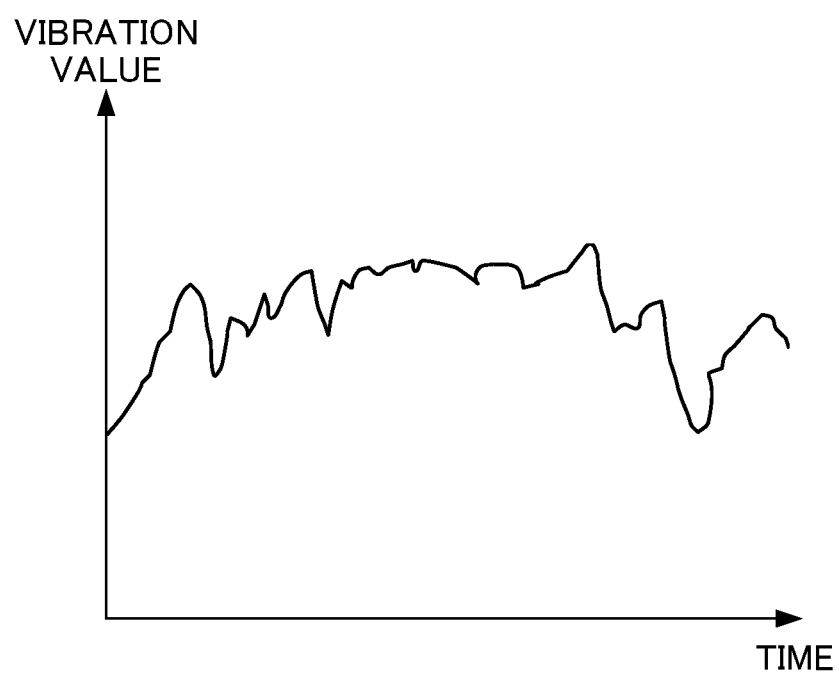
FIG. 3 shows exemplary vibration data about a grinding machine in FIG. 1.

FIG. 3 shows exemplary vibration data about the grinding machine 21 in FIG. 1. As shown in FIG. 3, the vibration data may be raw waveform data or a group of discrete numerical values.

The following description is based on the assumption that the input unit 301 inputs grinder information about a plurality of grinder candidates.

By using the learned model 51, the judgment unit 302 judges the adequacy or inadequacy of a combination between the grinding condition for the workpiece as a grinding target of the grinding machining and grinder information about each of a plurality of (n: n>1) grinder candidates (from a grinder (1) to a grinder (n)).

Figure 4:
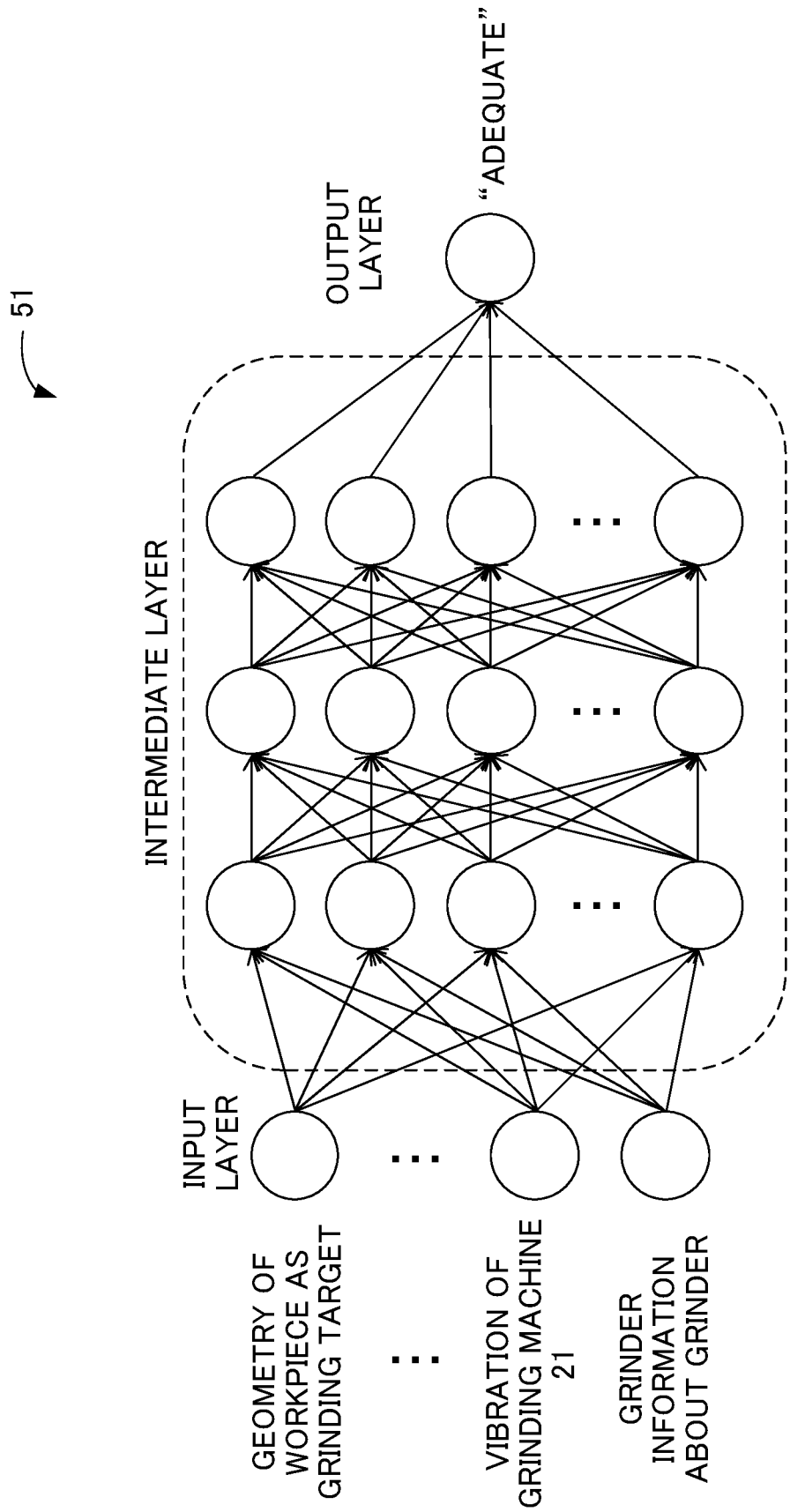
FIG. 4 shows an exemplary learned model held by the grinder selection device in FIG. 2.

FIG. 4 shows an example of the learned model 51 held by the grinder selection device 30 in FIG. 2 As shown in FIG. 4 the learned model 51 shown as an example is a multilayer neural network in which one grinding condition such as the geometry of a workpiece as a grinding target or vibration of the grinding machine 21, and grinder information about one grinder are in an input layer, and data indicating whether a combination between the grinding condition and the grinder information is "adequate" or "inadequate" (this data is also called "judgment information") is in an output layer.

In this case, the judgment unit 302 inputs the grinding condition and grinder information about one grinder candidate (grinder (i): i is equal to or greater than 1 and equal to or less than n) selected one by one from a plurality of grinder candidates to the learned model 51. By doing so, the judgment unit 302 becomes capable of judging whether selected one grinder candidate (grinder (i)) is "adequate" or "inadequate" for the grinding condition. In this way, the judgment unit 302 inputs n grinder candidates (from the grinder (1) to the grinder (n)) sequentially to the learned model 51 to become capable of identifying a grinder candidate judged to be adequate.

The input layer and the output layer of the learned model 51 are not limited to the foregoing configurations. As will be described later, one grinding condition and a plurality (M) of grinder information about grinders may be input in the input layer. In this case, the output layer may be configured to output a plurality (M) of judgment data (j) (j is equal to or greater than 1 and equal to or less than N) indicating adequacy or inadequacy in association with a plurality (M) of grinder information (1) (j is equal to or greater than 1 and equal to or less than M) about grinders, for example. The order of the grinder information in the input layer and the order of the judgment information in the output layer are associated with each other in one-to-one relationship.

By doing so, a plurality of the grinder candidates can be input to the learned model 51.

The learned model 51 is constructed by a machine learning device 40 described later in a learning phase.

If there is a plurality of grinder candidates judged to be "adequate" by the judgment unit 302, the selection unit 303 selects an optimum grinder on the basis of one element as a judgement criterion contained in grinder information. The selection unit 303 outputs the selected optimum grinder to the grinding machine 21.

More specifically, the selection unit 303 selects one optimum grinder on the basis of one of elements as follows as a judgment criterion: a grinder type (flat, ring, hollow, or tapered cup), an abrasive grain type (such as aluminum, silicon carbide, or cubic boron nitride), a grit size (grain size), a binder type (resin, metal, or vitrified), a grade (A (soft) to Z (hard)), a tissue (sizes of pores in a grinder), a grinder state that might be caused during grinding (shedding, glazing, or loading), self-sharpening effect of the grinder (sharpness restoration level during grinding), etc.

Namely, the judgment unit 302 may judge a plurality of grinders to be "adequate" in a manner that depends on a grinding condition. However, even if comparable machining quality can be achieved by any grinder, a difference is still caused by a grinder to be used in terms of time required for grinding or a degree of wear, for example.

In this regard, the selection unit 303 may use a grade as one element and select a grinder of the hardest grade, for example. This makes it possible to suppress consumption of the life of the grinder. Alternatively, the selection unit 303 may use a grade as one element and select a grinder of a soft grade. This generates difficulty in transmitting vibration of the grinding machine 21 to a member to be ground such as a workpiece, making it possible to improve a plane quality of the workpiece.

In other words, if there is a plurality of grinder candidates conforming to a grinding condition judged to be "adequate" by the judgment unit 302, a user can select a grinder responsive to a need such as suppression of consumption of the life of a grinder or improvement of a main part of a workpiece prior to grinding machining by the grinding machine 21.

The following describes more specific motion of the grinder selection device 30.

Figure 5:
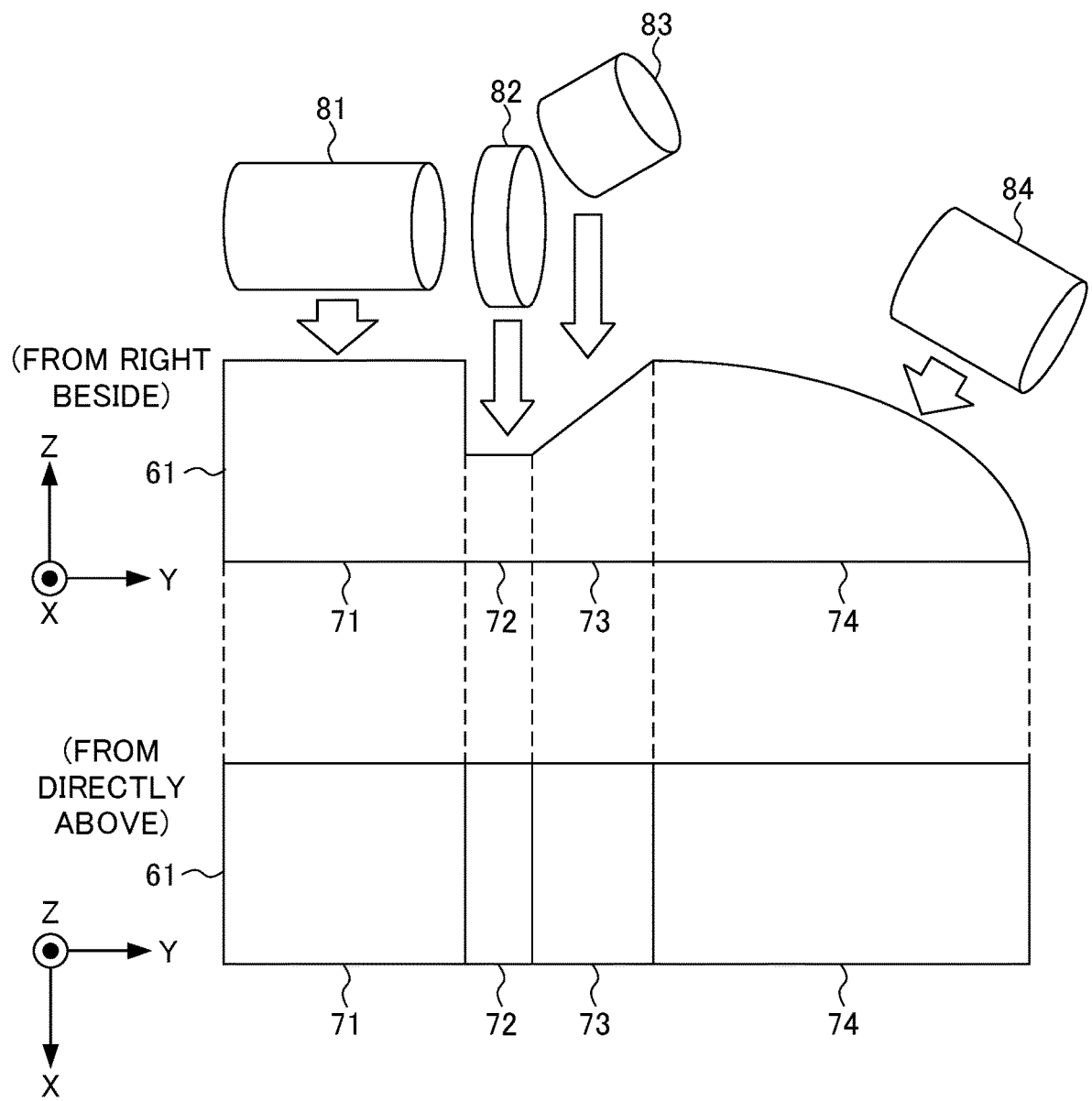
FIG. 5 shows an exemplary geometry of a workpiece formed by grinding machining by the grinding machine on the basis of a motion command in a machining program from a controller in FIG. 1.

FIG. 5 shows an exemplary geometry of a workpiece 61 formed by grinding machining by the grinding machine 21 on the basis of a motion command in a machining program from the controller 11 in FIG. 1. FIG. 5 shows the workpiece 61 viewed in a positive Y-axis direction (from right beside the workpiece 61) and the workpiece 61 viewed in a positive Z-axis direction (from directly above the workpiece 61). The shape of the workpiece 61 before grinding machining may be a square pole extending in a Y-axis direction, for example.

As shown in FIG. 5, the workpiece 61 as a grinding target is composed of shapes of four parts 71 to 74, for example. More specifically, the workpiece 61 has a part 71 of a large width in the Y-axis direction, a part 72 of a small width in the Y-axis direction, a part 73 exhibiting a tilted oblique plane on a YZ plane, and a part 74 exhibiting a curved plane on the YZ plane.

In FIG. 5, grinders optimum for grinding machining of the parts 71 to 74 are shown as grinders 81 to 84 respectively. A plurality of grinder candidates (for example, grinder A, grinder B, . . . , and grinder N) including the four grinders 81 to 84 is selectable for the grinding machine 21.

Figure 6:
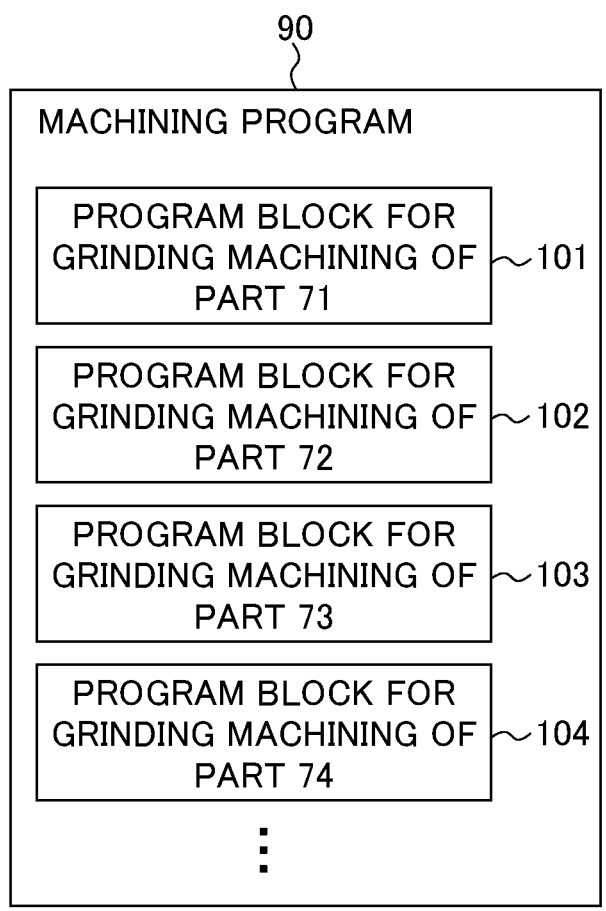
FIG. 6 shows an exemplary machining program for grinding machining of the workpiece into the geometry shown in FIG. 5.

FIG. 6 shows an example of a machining program 90 for grinding machining of the workpiece 61 into the geometry shown in FIG. 5.

The machining program 90 is contained in the control information in the controller 11. As shown in FIG. 6, the machining program 90 includes program blocks 101 to 104 for grinding machining of the parts 71 to 74 respectively. The machining program 90 is described in an NC program, for example. The program blocks 101 to 104 show machining paths for grinding machining of the parts 71 to 74 respectively.

In this case, prior to grinding machining by the grinding machine 21, the input unit 301 can acquire a grinding condition corresponding to each of the parts 71 to 74 such as the geometry and size of each of the parts 71 to 74 of the workpiece 61 from the machining path indicated by a corresponding one of the foregoing program blocks 101 to 104 in the machining program 90, a peripheral velocity of a grinder, a feedrate of the grinder, a depth of cut of the grinder, for example. The input unit 301 can further acquire a different grinding condition including data such as vibration data indicting vibration of the grinding machine 21 corresponding to each of the parts 71 to 74 from the controller 11, for example. Further, the input unit 301 can acquire a plurality of grinder candidates (for example, grinder A, grinder B, . . . , and grinder M).

For grinding of the part 71 shown in FIG. 5, for example, by using the learned model 51, the judgment unit 302 judges whether a combination between a grinding condition for the part 71 of the workpiece 61 as a grinding target and grinder information about each of a plurality of grinder candidates (for example, grinder A, grinder B, . . . , and grinder M) input by the input unit 301 is adequate or inadequate for grinding of the part 71 of the workpiece 61.

Likewise, the judgment unit 302 can judge whether a combination between a grinding condition for each of the parts 72 to 74 of the workpiece 61 as a grinding target and grinder information about each of a plurality of grinder candidates (for example, grinder A, grinder B, . . . , and grinder M) is adequate or inadequate for grinding of each of the parts 72 to 74 of the workpiece 61.

By doing so, the judgment unit 302 becomes capable of acquiring an adequate grinder candidate for each of the parts 71 to 74 of the workpiece 61.

On the basis of one element as a judgement criterion contained in grinder information, for example, the selection unit 303 can select an optimum grinder candidate for each of the parts 71 to 74 from grinder candidates judged to be "adequate" for each of the parts 71 to 74 by the judgment unit 302.

<Selection Process by Grinder Selection Device 30 in Working Phase>

Figure 7:
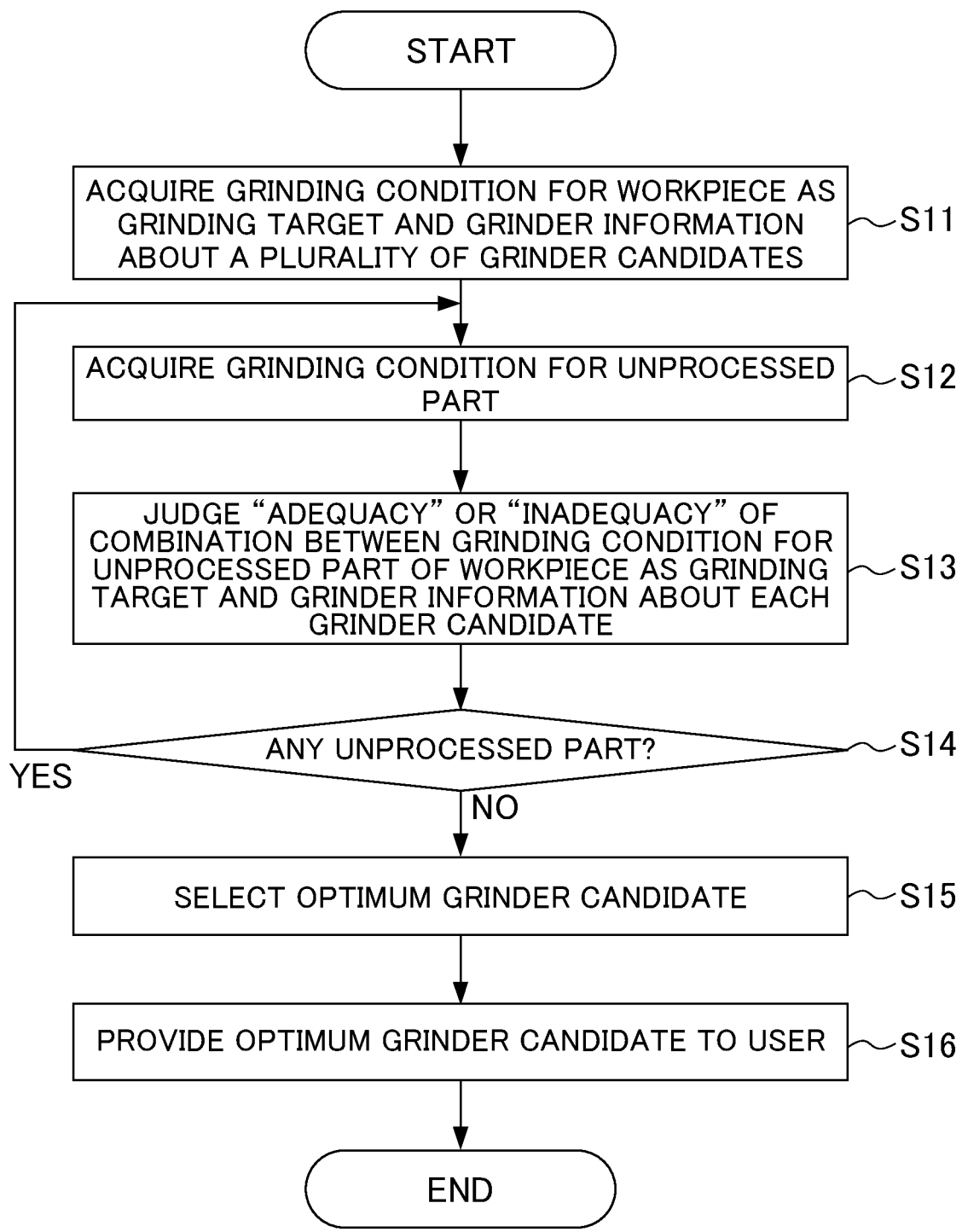
FIG. 7 is a flowchart explaining selection process by the grinder selection device in a working phase.

FIG. 7 is a flowchart explaining selection process by the grinder selection device 30 in a working phase using the geometry in FIG. 5 as an example of a workpiece geometry.

In step S11, prior to grinding machining by the grinding machine 21, the input unit 301 acquires grinding conditions for each of the parts 71 to 74 such as the geometry and size of each of the parts 71 to 74 of the workpiece 61 from the machining path indicated by a corresponding one of the foregoing program blocks 101 to 104 in the machining program 90, a peripheral velocity of a grinder, a feedrate of the grinder, a depth of cut of the grinder, etc. The input, unit 301 also acquires a different grinding condition including data such as vibration data indicting vibration of the grinding machine 21 at each of the parts 71 to 74. Further, the input unit 301 acquires grinder information about a plurality of grinder candidates (for example, grinder A, grinder B, . . . , and grinder M).

In step S12, the judgment unit 302 acquires a grinding condition for a part yet to be processed by the judgment unit 302 among the parts (71 to 74) of the workpiece 61.

In step S13, by using the learned model 51, the judgment unit 302 judges whether each combination between the grinding condition acquired in step S12 for the unprocessed part of the workpiece 61 as a grinding target and grinder information about each grinder candidate is "adequate" or "inadequate" for grinding of the unprocessed part of the workpiece 61. If all grinder candidates are subjected to judgment as to whether being "adequate" or "inadequate," the flow proceeds to step S14.

In step S14, the judgment unit 302 judges whether there is a part yet to be processed by the judgment unit 302 among the parts (71 to 74) of the workpiece 61. If there is an unprocessed part, the flow goes to step S12. If there is no part yet to be processed by the judgment unit 302, the flow proceeds to step S15.

In step S15, the selection unit 303 selects an optimum grinder candidate for each of the parts (71 to 74) of the workpiece 61 from the grinder candidates judged to be adequate in step S13 on the basis of one of elements as follows as a judgement criterion: a grinder type, an abrasive grain type, a grit size, a binder type, a grade, a tissue, etc.

In step S16, the selection unit 303 provides a user with information indicating the optimum grinder candidate selected in step S15.

<Machine Learning Device 40>

Figure 8:
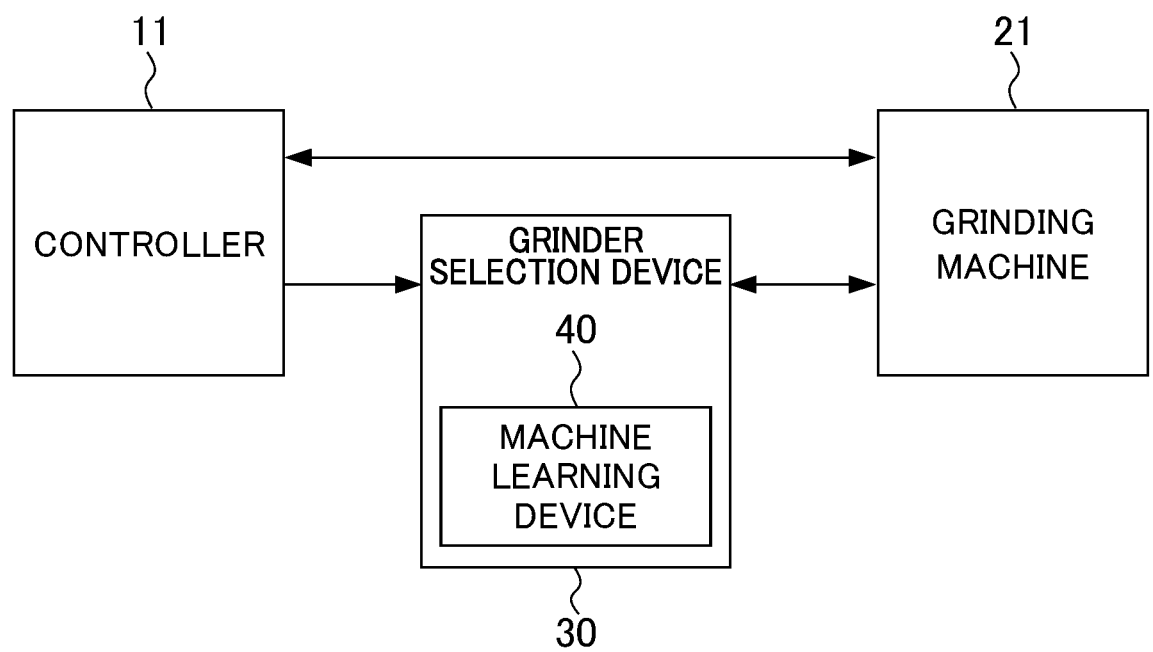
FIG. 8 shows the configuration of the numerical control system for machine learning.

FIG. 8 is a general view showing an example of a system for machining learning in outline. As shown in FIG. 8, the machine learning device 40 may be incorporated in the grinder selection device 30.

As will be described later, the machine learning device 40 performs supervised learning using training data containing input data and a label (correct answer). The input data contains a grinding condition for a workpiece as an arbitrary grinding target and grinder information about an arbitrary grinder. The label is data indicating the adequacy or inadequacy of a combination between the grinding condition and the grinder information about the grinder in the input data.

By doing so, the machine learning device 40 becomes capable of constructing the learned model 51 (neural network) used for judging the "adequacy" or "inadequacy" of the combination between the grinding condition for the workpiece as an arbitrary grinding target and the grinder information about the arbitrary grinder.

Figure 9:
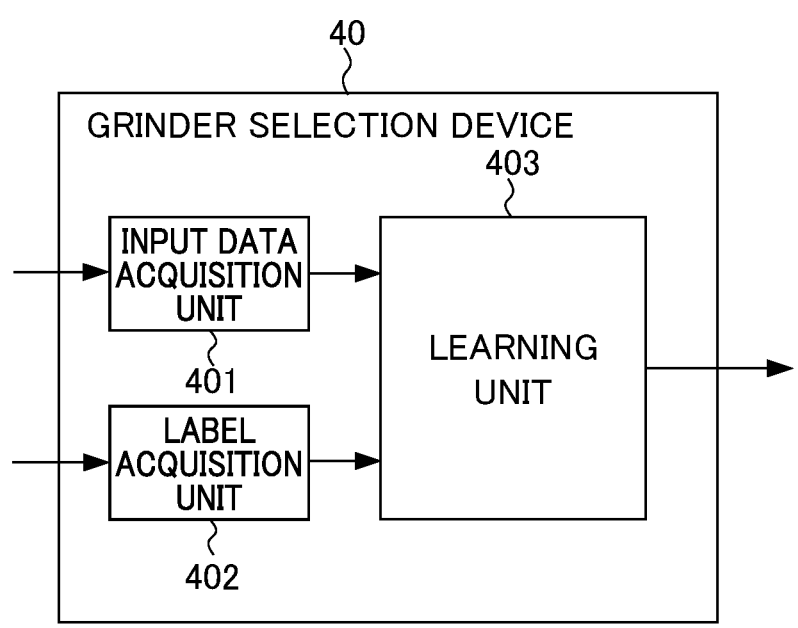
FIG. 9 is a functional block diagram showing an exemplary functional configuration of a machine learning device in FIG. 8.

FIG. 9 is a functional block diagram showing an exemplary functional configuration of the machine learning device 40 in FIG. 8.

As shown in FIG. 9, the machine learning device 40 includes an input data acquisition unit 401, a label acquisition unit 402, and a learning unit 403.

The input data acquisition unit 401 acquires a grinding condition for a workpiece as an arbitrary grinding target and grinder information about an arbitrary grinder as input data in a learning phase (during supervised learning), and outputs the acquired input data to the learning unit 403.

The label acquisition unit 402 acquires data as label data (correct answer data) indicating the adequacy or inadequacy of a combination between the grinding condition and the grinder information about the grinder in the input data, and outputs the acquired label data to the learning unit 403.

The label is not limited to a label indicating "adequacy" or "inadequacy" but may be represented by binary values of "1" and "0", for example.

The learning unit 403 accepts a combination of the foregoing input data and label as training data and performs supervised learning using the accepted training data, thereby constructing the learned model 51 to be used for judging whether a combination between a grinding condition for a workpiece as an arbitrary grinding target and grinder information about an arbitrary grinder is adequate or inadequate.

Preferably, many training data used for implementation of the supervised learning are prepared. For example, an expert may generate training data indicating the "adequacy" or "inadequacy" of a combination between every grinding condition and every grinder. Alternatively, training data may be acquired from the controllers 11 at a variety of places actually working in a factory of a customer, for example. More specifically, the customer coordinates control information using a variety of coordinate information in the factory of the customer, for example, so that various types of training data can be acquired.

For efficient learning by the machine learning device 40, the grinding machine 21 may be run while control information about combinations between various grinding conditions and various grinders is coordinated in a laboratory, for example, thereby acquiring many training data indicating "adequacy" or "inadequacy." In this case, the control information may be generated by a user or may be generated automatically by a device such as the controller 11, for example.

The learning unit 403 provides the constructed learned model 51 to the judgment unit 302.

If the learning unit 403 acquires new teacher data after constructing the learned model 51, the learning unit 403 may perform further supervised learning on the learned model 51 to update the learned model 51 after the learned model 51 is constructed once.

The learned model 51 may be shared with a different grinder selection device 30. Sharing the learned model 51 between a plurality of grinder selection devices 30 allows each of the grinder selection devices 30 to perform supervised learning in a decentralized manner, thereby achieving increased efficiency of the supervised learning.

Figure 10:
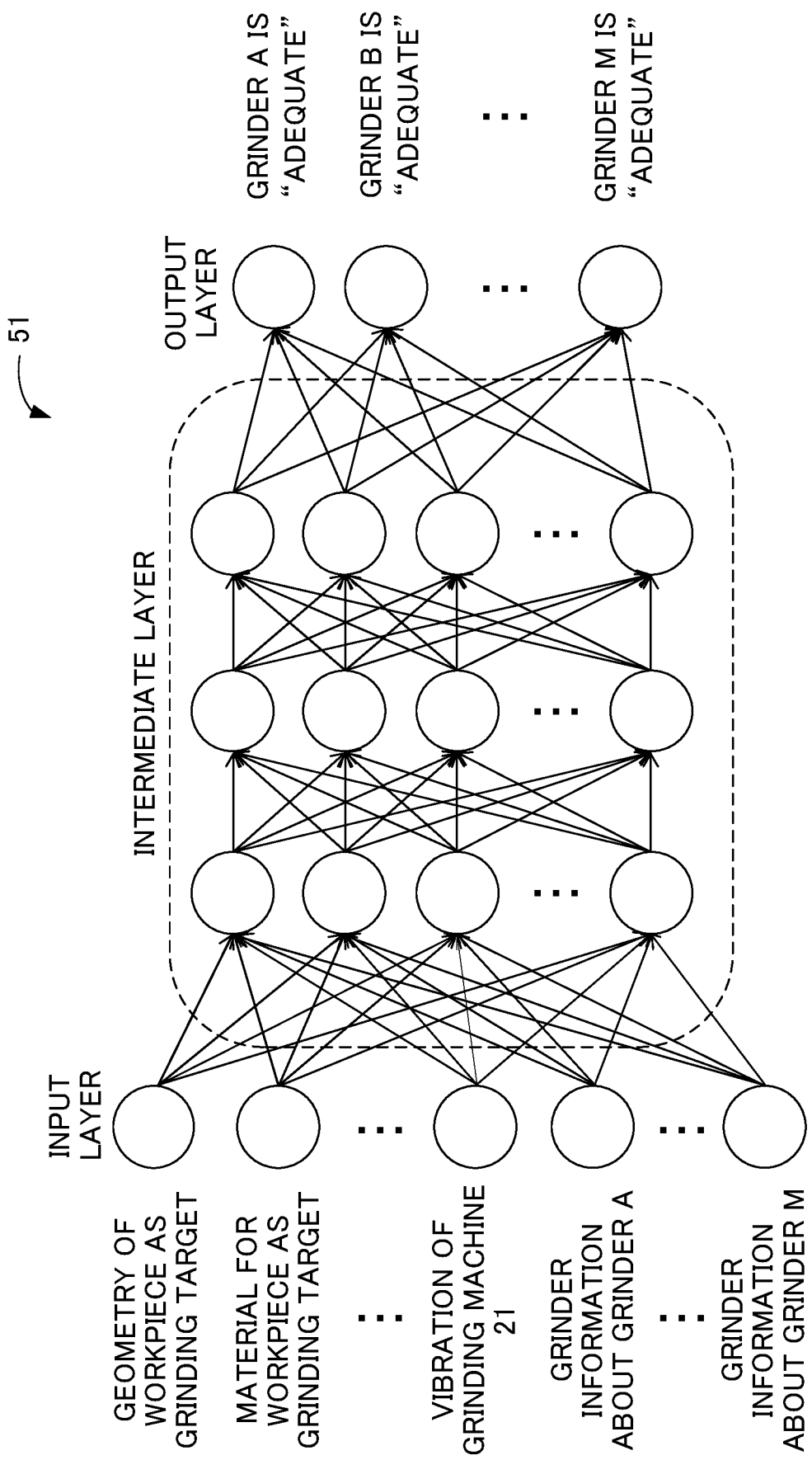
FIG. 10 shows an exemplary learned model held by the grinder selection device in FIG. 2.

As shown in FIG. 4, the learned model 51 is described as a multilayer neural network in which a grinding condition such as the geometry of a workpiece as a grinding target or vibration of the grinding machine 21, and grinder information about one grinder are in an input layer, and "adequacy" is in an output layer. However, the learned model 51 is not limited to this network. As shown in FIG. 10, for example, the learned model 51 may be a neural network in which a grinding condition such as the geometry of a workpiece as a grinding target or vibration of the grinding machine 21, and grinder information about each of a plurality of grinders are in an input layer, and "adequacy" of each of the grinders is in an output layer.

FIG. 10 shows an exemplary learned model held by the grinder selection device in FIG. 2.

As a result, the grinder selection device 30 becomes capable of making judgments in parallel as to whether a plurality of grinders is "adequate" or "inadequate" to allow increase in processing speed.

The foregoing supervised learning may be performed as online learning, batch learning, or mini-batch learning.

The online learning is a learning method by which, each time grinding by the grinding machine 21 is performed and teacher data is generated, the supervised learning is performed immediately. The batch learning is a learning method by which, while machining by the grinding machine 21 is performed and teacher data is generated repeatedly, a plurality of teacher data responsive to the repetitions is collected and the supervised learning is performed using all the collected teacher data. The mini-batch learning is a learning method intermediate between the online learning and the batch learning by which, each time a certain quantity of teacher data is accumulated, the supervised learning is performed.

As described above, the grinder selection device 30 according to the first embodiment is a grinder selection device that selects an adequate grinder to be used for grinding machining by the grinding machine 21 prior to the grinding machining. The grinder selection device 30 includes: the input unit 301 that inputs a grinding condition for the workpiece 61 as a grinding target of the grinding machining including at least the geometry of the workpiece 61 and vibration data indicating vibration of the grinding machine 21, and grinder information about one or more grinders to become grinder candidates to be used for the grinding machining; the learned model 51 acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, and grinder information about an arbitrary grinder, the label data being data indicating the adequacy or inadequacy of a combination between the grinding condition and the grinder information about the grinder; and the judgment unit 302. By using the learned model 51, the judgment unit 302 judges a grinder candidate forming an adequate combination with a grinding condition for the grinding machining on the basis of the grinder information input by the input unit 301 about one or more grinders to become grinder candidates to be used for the grinding machining.

The grinder selection device 30 uses the learned model 51 constructed by incorporating vibration data about the grinding machine 21 into a grinding condition. As a result, an adequate grinder candidate responsive to a grinding condition for the workplace 61 as a grinding target can be identified independently of the grinding machine 21. This eliminates the need for the grinder selection device 30 to prepare a file for identifying an adequate grinder candidate for each material for a member to be ground, for each grinding condition, for each grinding machine, etc.

The grinder selection device 30 shares the learned model 51 with a different grinder selection device 30. Thus, the learned model 51 is still applicable in the presence of a newly installed grinding machine. The grinder selection device 30 can select an optimum grinder from adequate grinder candidates on the basis of one of elements as follows as a judgment criterion: a grinder type, an abrasive grain type, a grit size, a grade, etc. This allows the grinder selection device 30 to select an optimum grinder responsive to a need such as suppression of consumption of the life of a grinder or improvement of a plane quality of a workpiece.

The first embodiment is as has been described above.

Second Embodiment

A grinder selection device according to a second embodiment differs from the grinder selection device according to the first embodiment in that grinder information about a grinder forming an adequate combination with a grinding condition for grinding machining by an arbitrary grinding machine is output by using a learned model generated in advance through supervised learning using training data containing input data and label data. The input data contains an arbitrary grinding condition for a workpiece as a grinding target of the grinding machining including at least the geometry of the workpiece and vibration data indicating vibration of the grinding machine. The label data is data indicating grinder information about a grinder adequate for the grinding condition.

The second embodiment will be described below.

Figure 11:
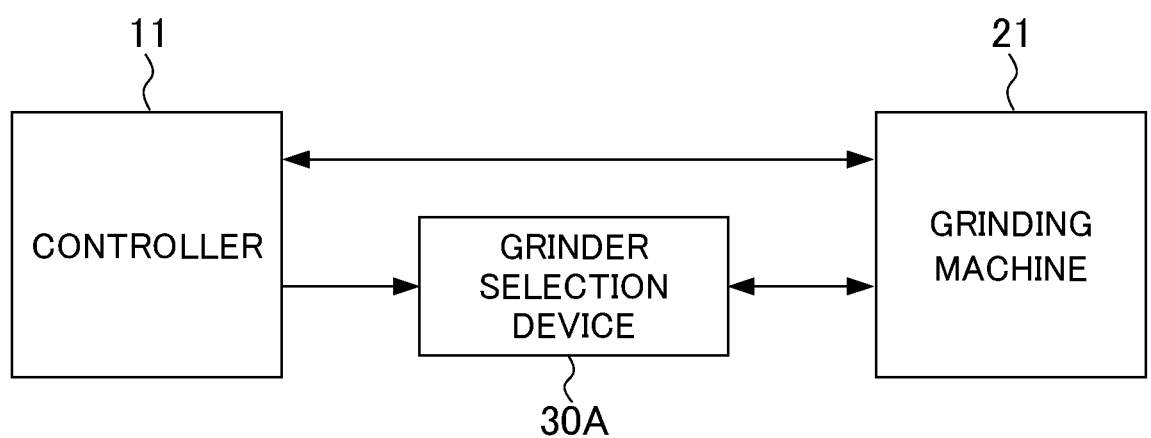
FIG. 11 shows an entire configuration of a numerical control system according to a second embodiment.

FIG. 11 shows an entire configuration of a numerical control system including a grinder selection device 30A according to the second embodiment. The numerical control system includes a controller 11 and a grinding machine 21 in addition to the grinder selection device 30A. An element having the same function as an element in FIG. 1 wall be given the same reference numeral and will not be described.

Figure 12:
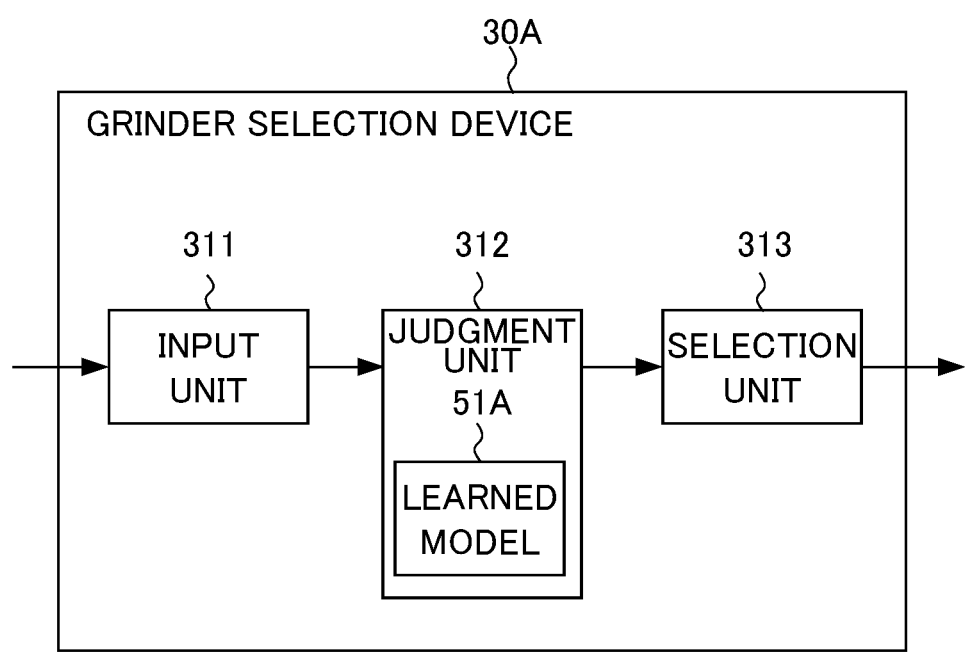
FIG. 12 is a functional block diagram showing an exemplary functional configuration of a grinder selection device according to the second embodiment.

FIG. 12 is a functional block diagram showing an exemplary functional configuration of the grinder selection device 30A according to the second embodiment.

As shown in FIG. 12, the grinder selection device 30A includes an input unit 311, an output unit 312, a selection unit 313, and a learned model 51A. A functional block having the same function as a functional block in the block diagram of FIG. 2 will be given the same sign and will not be described.

Prior to grinding machining by the grinding machine 21, the input unit 311 inputs a grinding condition for a workpiece as a grinding target of the grinding machining including at least the geometry of the workpiece and vibration data indicating vibration of the grinding machine 21 from the controller 11, for example. The input unit 311 outputs the input grinding condition for the workpiece as a grinding target to the output unit 312.

In the second embodiment, the input unit 311 does not input grinder information about a plurality of grinder candidates (for example, grinder A1, grinder B1, etc.).

Prior to the grinding machining by the grinding machine 21, the output unit 312 inputs the grinding condition for the workpiece as a grinding target input by the input unit 311 including at least the geometry of the workpiece and the vibration data indicating vibration of the grinding machine 21 to the learned model 51A generated in advance through supervised learning using training data containing input data and label data. The input data contains an arbitrary grinding condition for a workpiece as a grinding target of grinding machining by an arbitrary grinding machine including at least the geometry of the workpiece and vibration data indicating vibration of the grinding machine. The label data is data indicating grinder information about a grinder adequate for the grinding condition. By doing so, the output unit 312 outputs grinder information about a grinder forming an adequate combination with the grinding condition.

Figure 13:
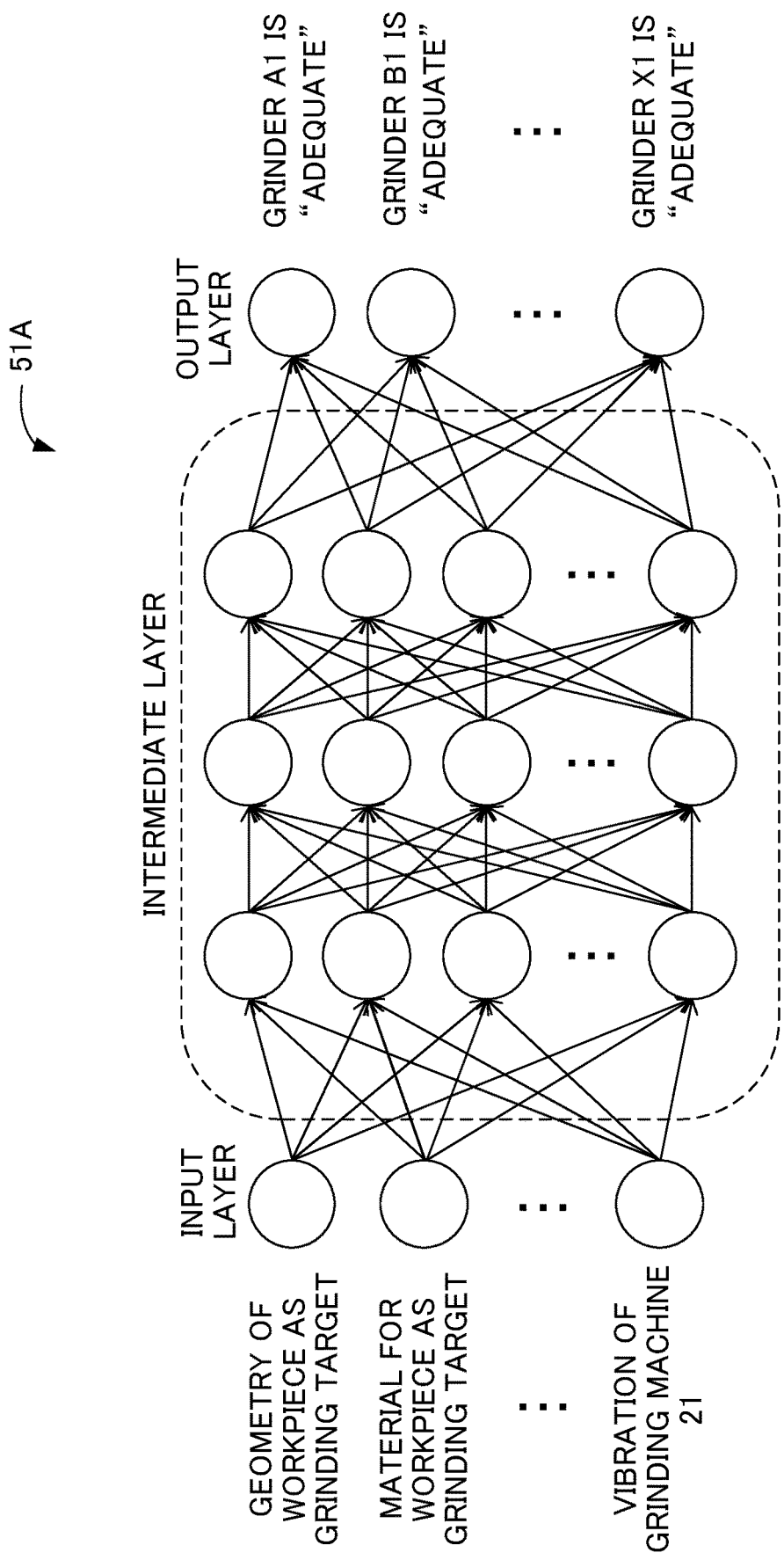
FIG. 13 shows an exemplary learned model held by the grinder selection device in FIG. 12.

FIG. 13 shows an example of the learned model 51A held by the grinder selection device 30A in FIG. 12. As shown in FIG. 13, the learned model 51A is a multilayer neural network in which grinding conditions such as the geometry of a workpiece as a grinding target, a material for the workpiece as a grinding target, and vibration of the grinding machine 21 are in an input layer, and an "adequate" grinder candidate is in an output layer. As described above, the learned model 51A of the second embodiment is to output a subset of grinder candidates forming adequate combinations with an arbitrary grinding condition on the basis of a set of grinder candidates defined in advance.

The learned model 51A is constructed by a machine learning device 40A described later in a learning phase.

If there is a plurality of "adequate" grinder candidates output from the output unit 312, the selection unit 313 selects a grinder optimum for the grinding machining. The selection unit 313 outputs the selected optimum grinder to a user. The selection unit 313 may provide grinder information available to the user, which is an "adequate" grinder candidate output from the output unit 312. The other function of the selection unit 313 is the same as that of the selection unit 303 of the first embodiment and will not be described in detail accordingly.

<Selection Process by Grinder Selection Device 30A in Working Phase>

Figure 14:
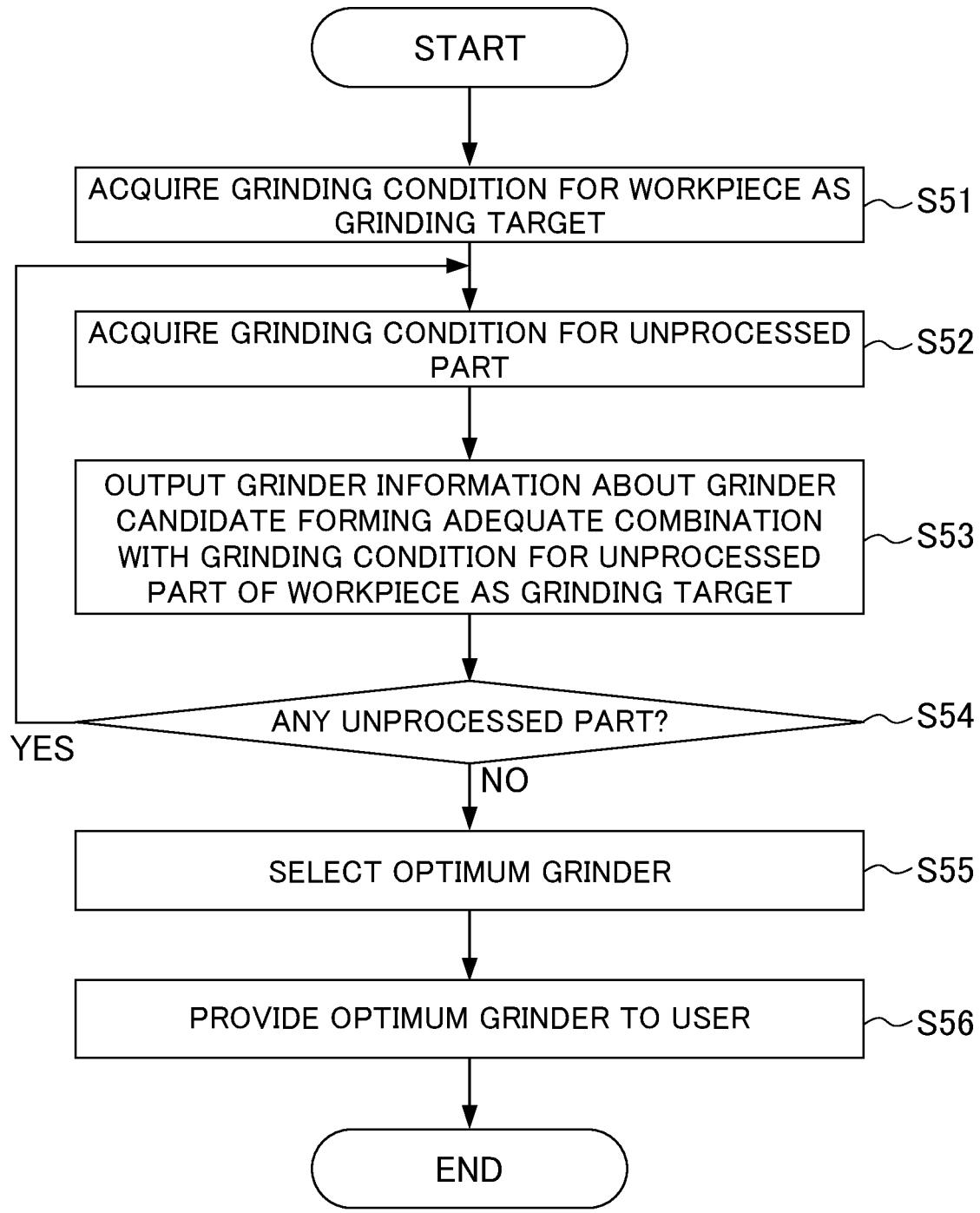
FIG. 14 is a flowchart explaining selection process by the grinder selection device in a working phase.

FIG. 14 is a flowchart explaining selection process by the grinder selection device 30A in a working phase on the assumption that grinding machining of a workpiece is to form the geometry in FIG. 5 as an example of a workpiece geometry.

In step S51, prior to grinding machining by the grinding machine 21, the input unit 311 acquires grinding conditions for each of the parts 71 to 74 such as the geometry and size of each of the parts 71 to 74 of the workpiece 61 from the machining path indicated by a corresponding one of the foregoing program blocks 101 to 104 in the machining program 90, a peripheral velocity of a grinder, a feedrate of the grinder, a depth of cut of the grinder, etc. The input unit 311 also acquires a different grinding condition including data such as vibration data indicting vibration of the grinding machine 21 at each of the parts 71 to 74.

In step S52, the output unit 312 acquires a grinding condition for a part yet to be processed by the output unit 312 among the parts (71 to 74) of the workpiece 61.

In step S53, by using the learned model 51A, the output unit 312 inputs the grinding condition for the unprocessed part of the workpiece 61 as a grinding target acquired in step S52 to the learned model 51A, thereby outputting grinder information about a grinder candidate forming an adequate combination with the grinding condition.

In step S54, the output unit 312 judges whether there is a part yet to be processed by the output unit 312 among the parts (71 to 74) of the workpiece 61. If there is an unprocessed part, the flow goes to step S52. If there is no part yet to be processed by the output unit 312, the flow proceeds to step S55.

In step S55, the selection unit 313 selects an optimum grinder for each of the parts (71 to 74) of the workpiece 61 from the grinder candidates judged to be adequate in step S53 on the basis of one of elements as follows as a judgment criterion: a grinder type, an abrasive grain type, a grit size, a binder type, a grade, a tissue, etc.

In step S56, the selection unit 313 provides a user with information indicating the optimum grinder selected in step S55.

<Machine Learning Device 40A>

Figure 15:
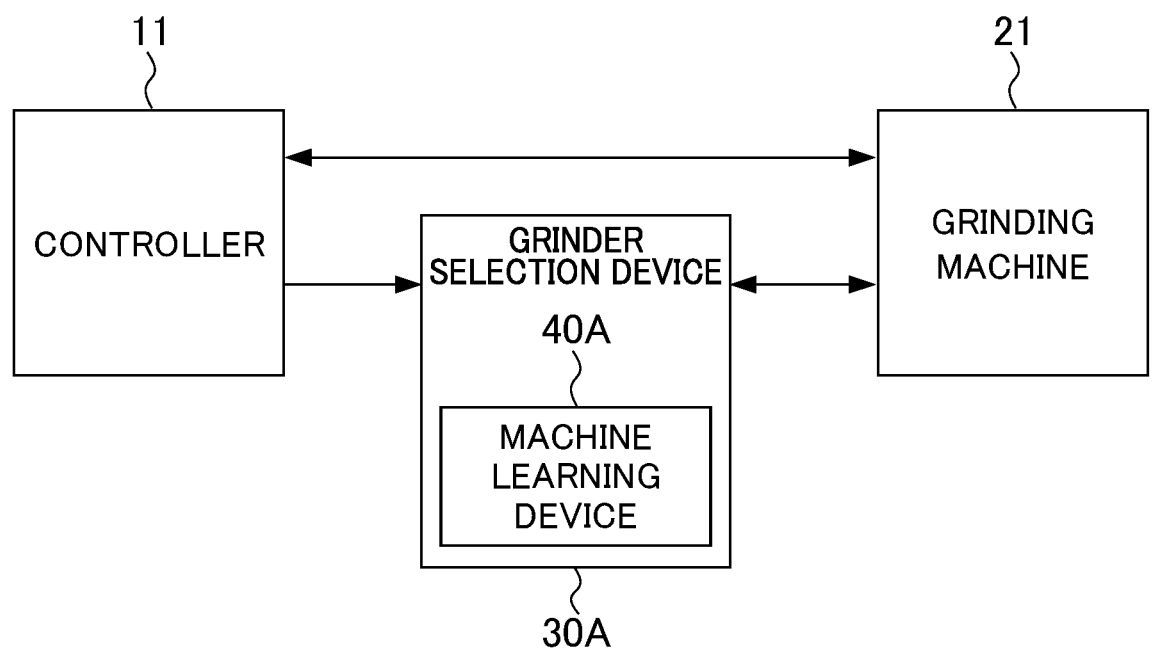
FIG. 15 shows the configuration of the numerical control system for machine learning.

FIG. 15 is a general view showing an example of a system for machining learning in outline. As shown in FIG. 15, the machine learning device 40A may be incorporated in the grinder selection device 30A.

As will be described later, the machine learning device 40A performs supervised learning using training data containing input data and label data. The input data contains an arbitrary grinding condition for a workpiece as a grinding target of grinding machining by an arbitrary grinding machine including at least the geometry of the workpiece and vibration data indicating vibration of the grinding machine. The label data is data indicating a grinder candidate adequate for the grinding condition.

By doing so, the machine learning device 40A becomes capable of constructing the learned model 51A (neural network) used for outputting grinder information about a grinder forming an adequate combination with a grinding condition for a workpiece as an arbitrary grinding target.

Figure 16:
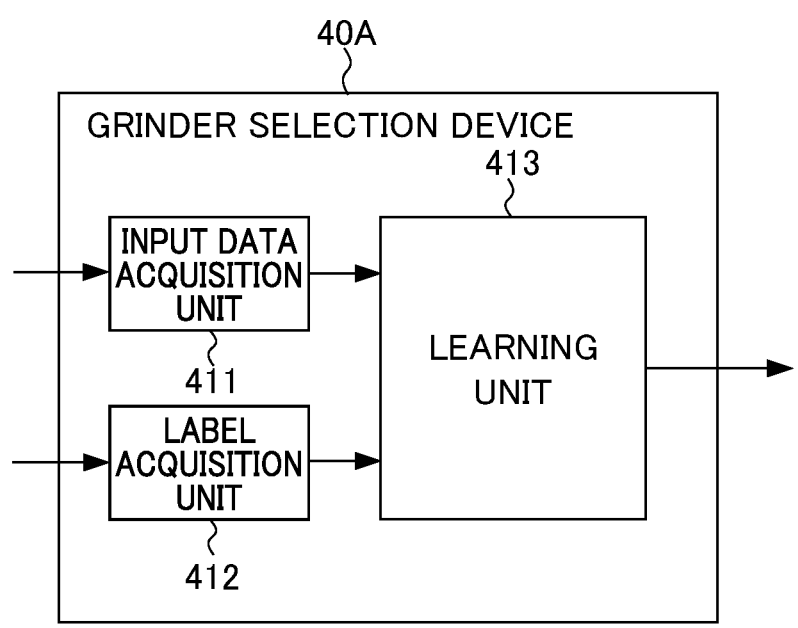
FIG. 16 is a functional block diagram showing an exemplary functional configuration of a machine learning device in FIG. 15.

FIG. 16 is a functional block diagram showing an exemplary functional configuration of the machine learning device 40A in FIG. 15.

As shown in FIG. 16, the machine learning device 40A includes an input data acquisition unit 411, a label acquisition unit 412, and a learning unit 413.

The input data acquisition unit 411 acquires an arbitrary grinding condition for a workpiece as a grinding target of grinding machining by an arbitrary grinding machine including at least the geometry of the workpiece and vibration data indicating vibration of the grinding machine as input data in a learning phase (during supervised learning), and outputs the acquired input data to the learning unit 413.

The label acquisition unit 412 acquires data indicating grinder information about a grinder adequate for the grinding condition in the input data as label data, and outputs the acquired label to the learning unit 413. More specifically, the label acquisition unit 412 acquires data indicating a grinder candidate adequate for the grinding condition from a set of grinder candidates {grinder A1, grinder B1, . . . , and grinder X1} defined in advance as label data, and outputs the acquired label to the learning unit 413, for example.

The learning unit 413 accepts a combination of the foregoing input data and label as training data and performs supervised learning using the accepted training data. By doing so, the learning unit 413 constructs the learned model 51A used for outputting grinder information about a grinder adequate for an arbitrary grinding condition for a workpiece as a grinding target of grinding machining by an arbitrary grinding machine including at least the geometry of the workpiece and vibration data indicating vibration of the grinding machine.

Preferably, many training data used for implementation of the supervised learning are prepared. For example, an expert may generate a grinding condition and label data about an "adequate" grinder candidate. Alternatively, a grinding condition and label data about an "adequate" grinder candidate may be acquired from the controllers 11 at a variety of places actually working in a factory of a customer, for example.

For efficient learning by the machine learning device 40A, the grinding machine 21 may be run while control information about combinations between various grinding conditions and various grinders is coordinated in a laboratory, for example, thereby acquiring many label data about "adequate" grinder candidates. In this case, the control information may be generated by a user or may be generated automatically by a device such as the controller 11, for example.

If new teacher data is acquired after the learned model 51A is constructed, the machine learning device 40A may perform further supervised learning on the learned model 51A to update the learned model 51A after the learned model 51A is constructed once.

The learned model 51A may be shared with a different grinder selection device 30A. Sharing the learned model 51A between a plurality of grinder selection devices 30A allows each of the grinder selection devices 30A to perform supervised learning in a decentralized manner, thereby achieving increased efficiency of the supervised learning.

As described above, the grinder selection device 30A according to the second embodiment is a grinder selection device that selects an adequate grinder to be used for grinding machining by the grinding machine 21 prior to the grinding machining. The grinder selection device 30A includes: the input unit 311 that inputs a grinding condition for the workpiece 61 as a grinding target of the grinding machining including at least the geometry of the workpiece 61 and vibration data indicating vibration of the grinding machine 21; the learned model 51A acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, the label data being data indicating grinder information about a grinder adequate for the grinding condition; and the output unit 312. By using the learned model 51A, the output unit 312 outputs grinder information about a grinder forming an adequate combination with a grinding condition for the grinding machining on the basis of the grinding condition input by the input unit 311.

The grinder selection device 30A uses the learned model 51A constructed by incorporating vibration data about the grinding machine 21 into a grinding condition. As a result, an optimum grinder responsive to a grinding condition for the workpiece 61 as a grinding target can be identified independently of the grinding machine 21. This eliminates the need for the grinder selection device 30A to prepare a file for identifying an adequate grinder for each material for a member to be ground, for each grinding condition, for each grinding machine, etc.

The grinder selection device 30A shares the learned model 51A with a different grinder selection device 30A. Thus, the learned model 51A is still applicable in the presence of a newly installed grinding machine.

The grinder selection device 30A can select an optimum grinder from adequate grinders on the basis of one of elements as follows as a judgment criterion: a grinder type, an abrasive grain type, a grit size, a grade, etc. This allows the grinder selection device 30A to select an optimum grinder responsive to a need such as suppression of consumption of the life of a grinder or improvement of a plane quality of a workpiece.

The second embodiment is as has been described above.

While the first embodiment and the second embodiment have been described above, the grinder selection device 30A is not limited to the foregoing embodiments but changes, modifications, etc. of the grinder selection device 30A are devised within a range in which the purpose is attainable.

<First Modification>

For example, in the first embodiment and the second embodiment described above, the controller 11 and the grinding machine 21 are configured as separate devices. However, this is not the only configuration. As described above, the grinder machine 21 may include the controller 11. Each of the grinder selection devices 30 and 30A and each of the machine learning devices 40 and 40A are configured as devices separate from the controller 11 and the grinding machine 21. However, this is not the only configuration. For example, all or some of the functions of each of the grinder selection devices 30 and 30A and all or some of the functions of each of the machine learning devices 40 and 40A may be fulfilled by the controller 11 or the grinding machine 21.

Alternatively, all or some of the functions of each of the grinder selection devices 30 and 30A and/or all or some of the functions of each of the machine learning devices 40 and 40A may be fulfilled using a virtual server function in the cloud.

<Second Modification>

Figure 17:
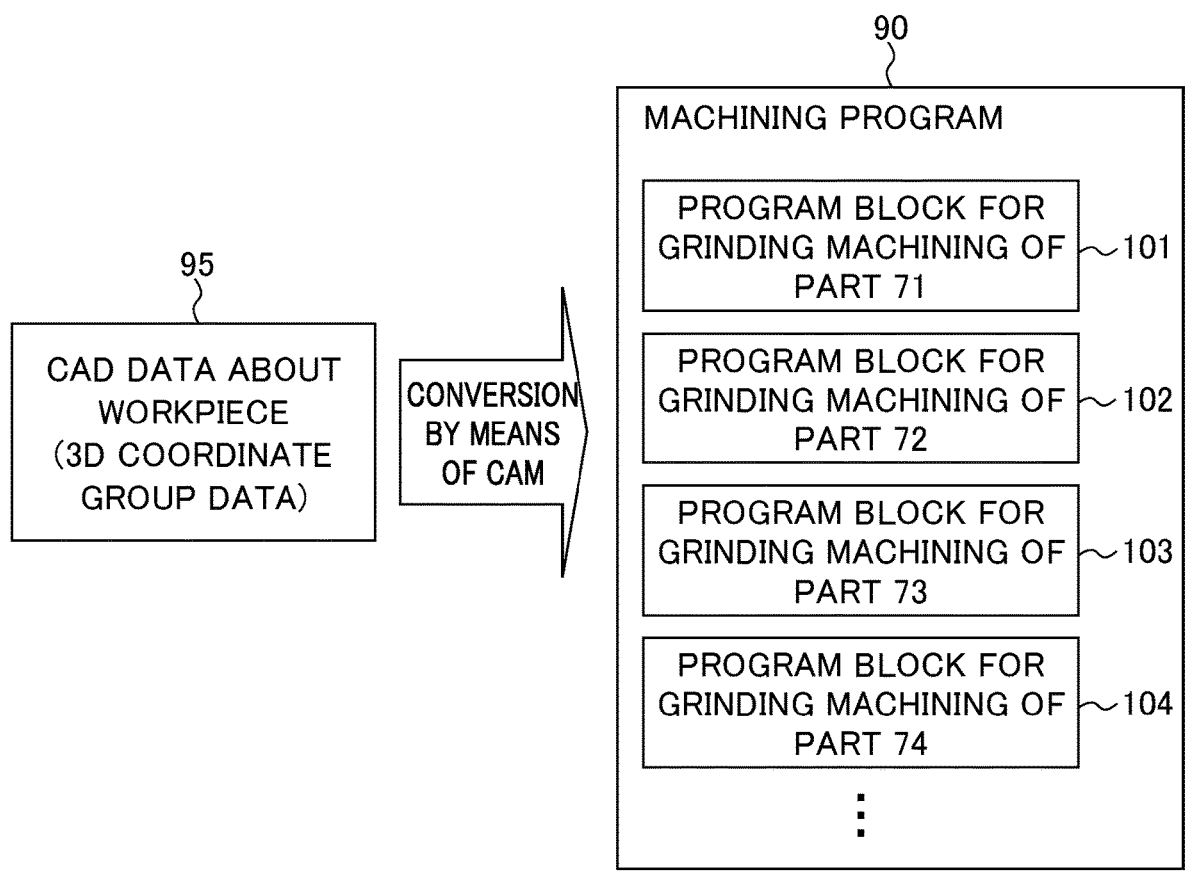
FIG. 17 shows an exemplary relationship between CAD data and a machining program.

For example, in the first embodiment and the second embodiment described above, each of the grinder selection devices 30 and 30A acquires the geometry and size of the workpiece 61 from a machining path indicated by a program block in the machining program 90. However, this is not the only configuration. As shown in FIG. 17 for example, the machining program 90 can be acquired by converting computer-aided design (CAD) data (3D coordinate group data) 95 about the workpiece 61 as a grinding target by means of computer-aided manufacturing (CAM). Each of the grinder selection devices 30 and 30A may acquire the geometry and size of each of the parts 71 to 74 of the workpiece 61 using CAD data (drawing information) about each of the parts 71 to 74 of the workpiece 61 as machining (grinding) path information.

FIG. 17 shows an exemplary relationship between the CAD data 95 and the machining program 90.

<Third Modification>

Figure 18:
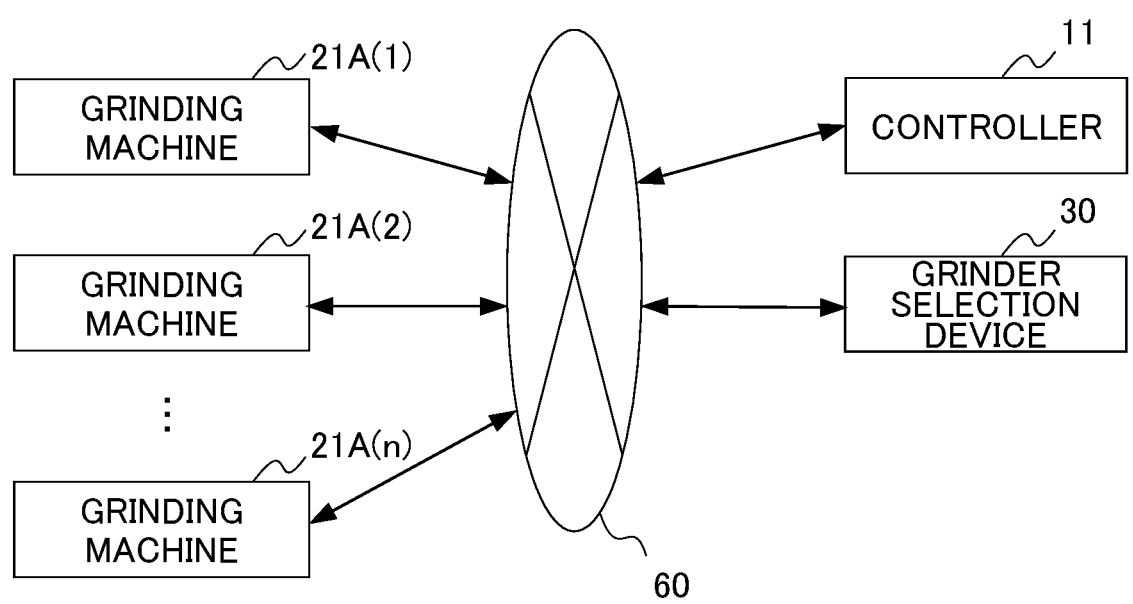
FIG. 18 shows an exemplary configuration of a numerical control system.

For example, in the first embodiment described above, the grinder selection device 30 selects an optimum grinder responsive to a grinding condition by one grinding machine 21 by using the learned model 51 provided from the machine learning device 40. However, this is not the only configuration. As shown in FIG. 18, for example, the grinder selection device 30 may select an optimum grinder responsive to a grinding condition by each of grinding machines 21A(1) to 21A(n) connected to a network 60 by using the learned model 51 for each of the grinding machines 21A(1) to 21A(n). Here, n is an integer equal to or greater than 1. Each of the grinding machines 21A(1) to 21A(n) corresponds to the grinding machine 21 in FIG. 1. By doing so, the learned model 51 is still applicable in the presence of a newly connected grinding machine.

The grinder selection device 30 and each of the grinding machines 21A(1) to 21A(n) may directly be connected to each other through a connection interface not shown.

The grinder selection device 30A according to the second embodiment can be operated in the same way as the grinder selection device 30 according to the first embodiment.

<Fourth Modification>

For example, in the first embodiment and the second embodiment described above, a target of grinding by the grinding machine 21 is the workpiece 61. However, this is not the only configuration. For example, a target of grinding by the grinding machine 21 may be a tool. In this case, the grinding machine 21 can be used for restoring performance such as sharpness inherent in the tool.

<Fifth Modification>

For example, in the first embodiment and the second embodiment described above, each of the selection units 303 and 313 selects an optimum grinder on the basis of one of elements including a grinder type, a grade, etc. as a judgement criterion. However, this is not the only configuration. For example, each of the selection units 303 and 313 may calculate an evaluation value E by adding at least two or more elements including a grinder type, a grade, etc. with weights, and select a grinder of the highest evaluation value E.

$$E = \alpha_1 \times \text{grinder type} + \alpha_2 \times \text{abrasive grain type} + \alpha_3 \times \text{grit size} + \alpha_4 \times \text{bender type} + \alpha_5 \times \text{grade} + \alpha_6 \times \text{tissue} \tag{1}$$

In this formula, $\alpha_1$ to $\alpha_6$ are weighting coefficients. Regarding a grinder type, a value responsive to a type is set in advance. For example, "flat" is "1.1" and "ring" is "1.2." Regarding an abrasive grain type, a value responsive to a type is set in advance. For example, "aluminum" is "1.1" and "silicon carbide" is "1.2." Regarding a grit size, a value responsive to a size is set in advance. For example, "small grit size" is "1.1," "middle grit size" is "1.2," and "large grit size" is "1.3." Regarding a binder type, a value responsive to a type is set in advance. For example, "resin" is "1.1" and "methane" is "1.2". Regarding a grade, a value responsive to a grade is set in advance. For example, "A (soft)" is "1.1" and "B" is "1.2." Regarding a tissue, a value responsive to a pore size is set in advance. For example, "small pore" is "1.1," "middle pore" is "1.2," and "large pore" is "1.3."

In this way, each of the grinder selection devices 30 and 30A makes a determination by adding weights to become capable of selecting an optimum grinder through comprehensive judgment of suppression of consumption of the life of a grinder, the quality of a grinding plane, etc.

All the functions of each of the grinder selection devices 30 and 30A according to the first embodiment and the second embodiment described above can be realized by hardware, software, or a combination of hardware and software. Being realized by software means being realized by reading and execution of a program by a computer.

The program can be stored into various types of non-transitory computer-readable media and can be supplied to the computer. The non-transitory computer-readable media include various types of tangible storage media. Examples of the non-transitory computer-readable media include a magnetic storage medium (a flexible disk, magnetic tape, a hard disk drive, for example), a magneto-optical storage medium (an magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a RAM, for example). Alternatively, the program may be supplied to the computer using various types of transitory computer-readable media. Examples of the transitory computer-readable media include electrical signals, optical signals, and electromagnetic waves. The transitory computer-readable media can be used for supplying program to the computer through wired communication paths such as an electric wire and an optical fiber, or wireless communication paths.

Steps describing the program stored in a storage medium certainly include processes to be performed in time sequence in the order of the steps, and further include processes not to be necessarily performed in time sequence but to be performed in parallel or individually.

In other words, the grinder selection device and the grinder selection method of this disclosure can be embodied in a variety of different ways having the following configurations.

(1) The grinder selection device 30 of this disclosure is a grinder selection device that selects a grinder to be used for grinding machining by the grinding machine 21 prior to the grinding machining. The grinder selection device 30 includes: the input unit 301 that inputs a grinding condition for the workpiece 61 as a grinding target of the grinding machining including at least the geometry of the workpiece 61 and vibration data indicating vibration of the grinding machine 21, and grinder information about one or more grinders to become grinder candidates to be used for the grinding machining; the learned model 51 acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, and grinder information about an arbitrary grinder, the label data being data indicating the adequacy or inadequacy of a combination between the grinding condition and the grinder information about the grinder; and the judgment unit 302. By using the learned model 51, the judgment unit 302 judges a grander candidate forming an adequate combination with a grinding condition for the grinding machining on the basis of the grinder information input by the input unit 301 about one or more grinders to become grinder candidates to be used for the grinding machining.

The grinder selection device 30 uses the learned model 51 constructed by incorporating vibration data about the grinding machine 21 into a grinding condition. As a result, an optimum grinder candidate responsive to a grinding condition for the workpiece 61 as a grinding target can be identified independently of the grinding machine 21.

(2) The grinder selection device 30 may further include the selection unit 303. If there is a plurality of grinder candidates judged to be adequate by the judgment unit 302, the selection unit 303 defines one element contained in the grinder information as a judgment criterion and selects an optimum grinder from the grinder candidates on the basis of the judgment criterion.

This allows the grinder selection device 30 to select an optimum grinder responsive to a need such as suppression of consumption of the life of a grinder or improvement of a plane quality of a workpiece.

(3) The grinder selection device 30 may further include the selection unit 303. If there is a plurality of grinder candidates judged to be adequate by the judgment unit 302, the selection unit 303 calculates the evaluation value E for each of the grinder candidates by adding a plurality of elements contained in the grinder information with weights, and selects a grinder candidate of the highest evaluation value E as an optimum grinder from the grinder candidates.

In this way, the grinder selection device 30 makes a determination by adding weights to become capable of selecting an optimum grinder through comprehensive judgment of consumption of the life of a grinder, the quality of a grinding plane, etc.

(4) The grinder selection device 30 may further include the machine learning device 40 including: the input data acquisition unit 401 that acquires input data containing a grinding condition for a workpiece as a grinding target of grinding machining by an arbitrary grinding machine including at least the geometry of the workpiece and vibration data indicating vibration of the grinding machine, and grinder information about an arbitrary grander; the label acquisition unit 402 that acquires label data indicating the adequacy or inadequacy of a combination between the grinding condition and the grinder information about the grinder in the input data; and the learning unit 403 that performs supervised learning using the input data acquired by the input data acquisition unit 401 and the label data acquired by the label acquisition unit 402 to generate the learned model 51.

This eliminates the need for the grinder selection device 30 to prepare a file for selecting a grinder for each material for a member to be ground, for each grinding condition, for each grinding machine, etc.

(5) If the grinder selection device 30 is connected to the grinding machines 21A(1) to 21A(n) through the network 60, the learned model 51 may be used for each of the grinding machines 21A(1) to 21A(n).

By doing so, the learned model 51 is still applicable in the presence of a newly connected grinding machine.

(6) The grinder selection device 30A of this disclosure is a grinder selection device that selects a grinder to be used for grinding machining by the grinding machine 21 prior to the grinding machining. The grinder selection device 30A includes: the input unit 311 that inputs a grinding condition for the workpiece 61 as a grinding target of the grinding machining including at least the geometry of the workpiece 61 and vibration data indicating vibration of the grinding machine 21; the learned model 51A acquired in advance through supervised learning using training data containing input data and label data, the input data containing an arbitrary grinding condition for a workplace as a grinding target of grinding machining by an arbitrary grinding machine including at least the geometry of the workpiece and vibration data indicating vibration of the grinding machine, the label data being data indicating grinder information about a grinder adequate for the grinding condition; and the output unit 312. By using the learned model 51A, the output unit 312 outputs grinder information about a grinder forming an adequate combination with a grinding condition for the grinding machining on the basis of the grinding condition input by the input unit 311.

The grinder selection device 30A uses the learned model 51A constructed by incorporating vibration data about the grinding machine 21 into a grinding condition. As a result, an optimum grinder responsive to a grinding condition for the workpiece 61 as a grinding target can be identified independently of the grinding machine 21.

(7) The grinder selection device 30A may further include the selection unit 313. If the output unit 312 outputs a plurality of grinder information about grinders forming adequate combinations with a grinding condition for the grinding machining, the selection unit 313 defines one element contained in the grinder information as a judgment criterion and selects an optimum grinder from the grinders on the basis of the judgment criterion.

This allows the grinder selection device 30A to select an optimum grinder responsive to a need such as suppression of consumption of the life of a grinder or improvement of a plane quality of a workpiece.

(8) The grinder selection device 30A may further include the selection unit 313. If the output unit 312 outputs a plurality of grinder information about grinders forming adequate combinations with a grinding condition for the grinding machining, the selection unit 313 calculates an evaluation value by adding a plurality of elements contained in the grinder information with weights, and selects a grinder of the highest evaluation value as an optimum grinder from the grinders.

In this way, the grinder selection device 30A makes a determination by adding weights to become capable of selecting an optimum grinder through comprehensive judgment of suppression of consumption of the life of a grinder, the quality of a grinding plane, etc.

(9) The grinder selection device 30A may further include the machine learning device 40A including: the input data acquisition unit 411 that acquires input data containing a grinding condition for a workpiece as a grinding target of grinding machining by an arbitrary grinding machine including at least the geometry of the workpiece and vibration data indicating vibration of the grinding machine; the label acquisition unit 412 that acquires label data indicating grinder information about a grinder adequate for the grinding condition; and the learning unit 413 that performs supervised learning using the input data acquired by the input data acquisition unit 411 and the label data acquired by the label acquisition unit 412 to generate the learned model 51A.

This eliminates the need for the grinder selection device 30A to prepare a file for selecting a grinder for each material for a member to be ground, for each grinding condition, for each grinding machine, etc.

(10) If the grinder selection device 30A is connected to the grinding machines 21A(1) to 21A(n) through the network 60, the learned model 51A may be used for each of the grinding machines 21A(1) to 21A(n).

By doing so, the learned model 51A is still applicable in the presence of a newly connected grinding machine.

(11) The grinder selection method of this disclosure is a grinder selection method realized by a computer for selecting a grinder to be used for grinding machining by the grinding machine 21 prior to the grinding machining. The grinder selection method includes: an input step of inputting a grinding condition for the workpiece 61 as a grinding target of the grinding machining including at least the geometry of the workpiece 61 and vibration data indicating vibration of the grinding machine 21, and grinder information about one or more grinders to become grinder candidates to be used for the grinding machining; and a judgment step of judging a grinder candidate forming an adequate combination with a grinding condition for the grinding machining on the basis of the grinder information input in the input step about one or more grinders to become grinder candidates to be used for the grinding machining by using the learned model 51 acquired in advance through supervised learning using training data containing input data and label data. The input data contains an arbitrary grinding condition for the workpiece 61 as a grinding target of grinding machining by an arbitrary grinding machine including at least the geometry of the workplace 61 and vibration data indicating vibration of the grinding machine 21, and grinder information about an arbitrary grinder. The label data is data indicating the adequacy or inadequacy of a combination between the grinding condition and the grinder information about the grinder.

This grinder selection method achieves the same effect described in (1).

(12) The grinder selection method of this disclosure is a grinder selection method realized by a computer for selecting a grinder to be used for grinding machining by the grinding machine 21 prior to the grinding machining. The grinder selection method includes: an input step of inputting a grinding condition for the workpiece 61 as a grinding target of the grinding machining including at least the geometry of the workpiece 61 and vibration data indicating vibration of the grinding machine 21; and an output step of outputting grinder information about a grinder forming an adequate combination with a grinding condition for the grinding machining on the basis of the grinding condition input in the input step by using the learned model 51A acquired in advance through supervised learning using training data containing input data and label data. The input data contains an arbitrary grinding condition for the workpiece 61 as a grinding target of grinding machining by as arbitrary grinding machine including at least the geometry of the workpiece 61 and vibration data indicating vibration of the grinding machine 21. The label data is data indicating grinder information about a grinder adequate for the grinding condition.

This grinder selection method achieves the same effect described in (6).

EXPLANATION OF REFERENCE NUMERALS

11 Controller
21 Grinding machine
30, 30A Grinder selection device
40, 40A Machine learning device
301, 311 Input unit
302 Judgment unit
303, 313 Selection unit
312 Output unit
401, 411 Input data acquisition unit
402, 412 Label acquisition unit
403, 413 Learning unit
51, 51A Learned model

What is claimed is:
1. A grinder selection device that selects a grinder to be used for grinding machining by a grinding machine prior to the grinding machining, the grinder selection device comprising:
an input unit that inputs a grinding condition for a workpiece as a grinding target of the grinding machining including at least the geometry of the workpiece and vibration data indicating vibration of the grinding machine, and grinder information about one or more grinders to become grinder candidates to be used for the grinding machining;

a learned model acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, and grinder information about an arbitrary grinder, the label data being data indicating the adequacy or inadequacy of a combination between the grinding condition and the grinder information about the grinder; and a judgment unit, by using the learned model, the judgment unit judging a grinder candidate forming an adequate combination with a grinding condition for the grinding machining on the basis of the grinder information input by the input unit about one or more grinders to become grinder candidates to be used for the grinding machining.

2. The grinder selection device according to claim 1, further comprising a selection unit, if there is a plurality of grinder candidates judged to be adequate by the judgment unit, the selection unit defining one element contained in the grinder information as a judgment criterion and selecting an optimum grinder from the grinder candidates on the basis of the judgment criterion.

3. The grinder selection device according to claim 1, further comprising a selection unit, if there is a plurality of grinder candidates judged to be adequate by the judgment unit, the selection unit calculating an evaluation value for each of the grinder candidates by adding a plurality of elements contained in the grinder information with weights, and selecting a grinder candidate of the highest evaluation value as an optimum grinder from the grinder candidates.

4. The grinder selection device according to claim 1, further comprising a machine learning device comprising:
  an input data acquisition unit that acquires input data containing a grinding condition for a workpiece as a grinding target of grinding machining by an arbitrary grinding machine including at least the geometry of the workpiece and vibration data indicating vibration of the grinding machine, and grinder information about an arbitrary grinder;
  a label acquisition unit that acquires label data indicating the adequacy or inadequacy of a combination between the grinding condition and the grinder information about the grinder in the input data; and
  a learning unit that performs supervised learning using the input data acquired by the input data acquisition unit and the label data acquired by the label acquisition unit to generate the learned model.

5. The grinder selection device according to claim 1, wherein the grinder selection device is connected to a plurality of the grinding machines through a network, the learned model is used for each of the grinding machines.

6. A grinder selection device that selects a grinder to be used for grinding machining by a grinding machine prior to the grinding machining, the grinder selection device comprising:
  an input unit that inputs a grinding condition for a workpiece as a grinding target of the grinding machining including at least the geometry of the workpiece and vibration data indicating vibration of the grinding machine;
  a learned model acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, the label data being data indicating grinder information about a grinder adequate for the grinding condition; and
  an output unit, by using the learned model, the output unit outputting grinder information about a grinder forming an adequate combination with a grinding condition for the grinding machining on the basis of the grinding condition input by the input unit.

7. The grinder selection device according to claim 6, further comprising a selection unit, if the output unit outputs a plurality of grinder information about grinders forming adequate combinations with a grinding condition for the grinding machining, the selection unit defining one element contained in the grinder information as a judgment criterion and selecting an optimum grinder from the grinders on the basis of the judgment criterion.

8. The grinder selection device according to claim 6, further comprising a selection unit, if the output unit outputs a plurality of grinder information about grinders forming adequate combinations with a grinding condition for the grinding machining, the selection unit calculating an evaluation value by adding a plurality of elements contained in the grinder information with weights, and selecting a grinder of the highest evaluation value as an optimum grinder from the grinders.

9. The grinder selection device according to claim 6, further comprising a machine learning device comprising:
  an input data acquisition unit that acquires input data containing a grinding condition for a workpiece as a grinding target of grinding machining by an arbitrary grinding machine including at least the geometry of the workpiece and vibration data indicating vibration of the grinding machine;
  a label acquisition unit that acquires label data indicating grinder information about a grinder adequate for the grinding condition; and
  a learning unit that performs supervised learning using the input data acquired by the input data acquisition unit and the label data acquired by the label acquisition unit to generate the learned model.

10. The grinder selection device according to claim 6, wherein if the grinder selection device is connected to a plurality of the grinding machines through a network, the learned model is used for each of the grinding machines.

11. A grinder selection method realized by a computer for selecting a grinder to be used for grinding machining by a grinding machine prior to the grinding machining, the grinder selection method comprising:
  an input step of inputting a grinding condition for a workpiece as a grinding target of the grinding machining including at least the geometry of the workpiece and vibration data indicating vibration of the grinding machine, and grinder information about one or more grinders to become grinder candidates to be used for the grinding machining; and
  a judgment step of judging a grinder candidate forming an adequate combination with a grinding condition for the grinding machining on the basis the grinder information input in the input step about one or more grinders to become grinder candidates to be used for the grinding machining by using a learned model acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, and grinder information about an arbitrary grinder, the label data being data indicating the adequacy or inadequacy of a combination between the grinding condition and the grinder information about the grinder.

12. A grinder selection method realized by a computer for selecting a grinder to be used for grinding machining by a grinding machine prior to the grinding machining, the grinder selection method comprising:

an input step of inputting a grinding condition for a workpiece as a grinding target of the grinding machining including at least the geometry of the workpiece and vibration data indicating vibration of the grinding machine; and an output step of outputting grinder information about a grinder forming an adequate combination with a grinding condition for the grinding machining on the basis of the grinding condition input in the input step by using a learned model acquired in advance through supervised learning using training data containing input data and label data, the input data containing an arbitrary grinding condition for a workpiece as a grinding target of grinding machining by an arbitrary grinding machine including at least the geometry of the workpiece and vibration data indicating vibration of the grinding machine, the label data being data indicating grinder information about a grinder adequate for the grinding condition.

* * * * *